(12) United States Patent
Mielke et al.

(10) Patent No.: US 12,605,873 B2
(45) Date of Patent: Apr. 21, 2026

(54) EXTRUSION TECHNIQUE FOR FORMING POLYMER PREFORMS, AND TUBE-FORMING TECHNIQUE

(71) Applicant: KAUTEX MASCHINENBAU SYSTEM GMBH, Augsburg (DE)

(72) Inventors: Maurice Mielke, Much (DE); Michael Müller, Nörvenich (DE)

(73) Assignee: KAUTEX MASCHINENBAU SYSTEM GMBH

( * ) Notice: Subject to any disclaimer, the term of this patent is extended or adjusted under 35 U.S.C. 154(b) by 832 days.

(21) Appl. No.: 17/754,868

(22) PCT Filed: Oct. 15, 2020

(86) PCT No.: PCT/EP2020/079124
§ 371 (c)(1),
(2) Date: May 25, 2022

(87) PCT Pub. No.: WO2021/074340
PCT Pub. Date: Apr. 22, 2021

(65) Prior Publication Data
US 2024/0092009 A1 Mar. 21, 2024

(30) Foreign Application Priority Data

Oct. 15, 2019 (DE) .......................... 202019105681.9

(51) Int. Cl.
*B29C 48/325* (2019.01)
*B29C 48/09* (2019.01)
(Continued)

(52) U.S. Cl.
CPC ............ *B29C 48/327* (2019.02); *B29C 48/09* (2019.02); *B29C 48/2564* (2019.02);
(Continued)

(58) Field of Classification Search
None
See application file for complete search history.

(56) References Cited

U.S. PATENT DOCUMENTS

| | | | |
|---|---|---|---|
| 3,853,661 A | 12/1974 | Sudo | |
| 4,120,633 A | 10/1978 | Feuerherm | |
| | (Continued) | | |

FOREIGN PATENT DOCUMENTS

| | | |
|---|---|---|
| GB | 1456744 A | 11/1976 |
| JP | S5142872 U | 3/1976 |
| WO | 2010029144 A2 | 3/2010 |

OTHER PUBLICATIONS

German Patent Office, "International Search Report & Written Opinion", issued in connection with International Patent Application No. PCT/EP2020/079124, dated Jan. 29, 2022 (9 pages).

*Primary Examiner* — Jacob T Minskey
*Assistant Examiner* — Adrien J Bernard
(74) *Attorney, Agent, or Firm* — Holland & Hart LLP

(57) ABSTRACT

Methods, apparatuses, systems, and techniques relate to a tube-forming device for an extruder unit or an extrusion device and a tube-forming process. The tube-forming device comprises at least one shaping sleeve, which is designed to shape a supplied stream of polymer melt from a substantially strand-like cross section into a tubular cross section. The shaping sleeve has a guiding passage embedded in the sleeve wall, such that the guiding passage is a cavity which lies within the sleeve wall and, in the radial direction of the shaping sleeve, is enclosed in a sealed manner with respect to the outer surfaces.

4 Claims, 22 Drawing Sheets

(51) Int. Cl.
    *B29C 48/25*       (2019.01)
    *B29C 49/04*       (2006.01)
    *B29C 49/22*       (2006.01)
    *B29L 23/00*       (2006.01)

(52) U.S. Cl.
    CPC .. *B29C 49/04108* (2022.05); *B29C 49/04112*
          (2022.05); *B29C 49/22* (2013.01); *B29L*
                  *2023/22* (2013.01)

(56)           References Cited

U.S. PATENT DOCUMENTS

| | | | |
|---|---|---|---|
| 4,297,092 A | 10/1981 | Goron | |
| 4,420,451 A | 12/1983 | Rasmussen | |
| 5,843,539 A | 12/1998 | Harvey et al. | |

Nozzle body movement

Mandrel body movement

Fig. 10    Nozzle body movement
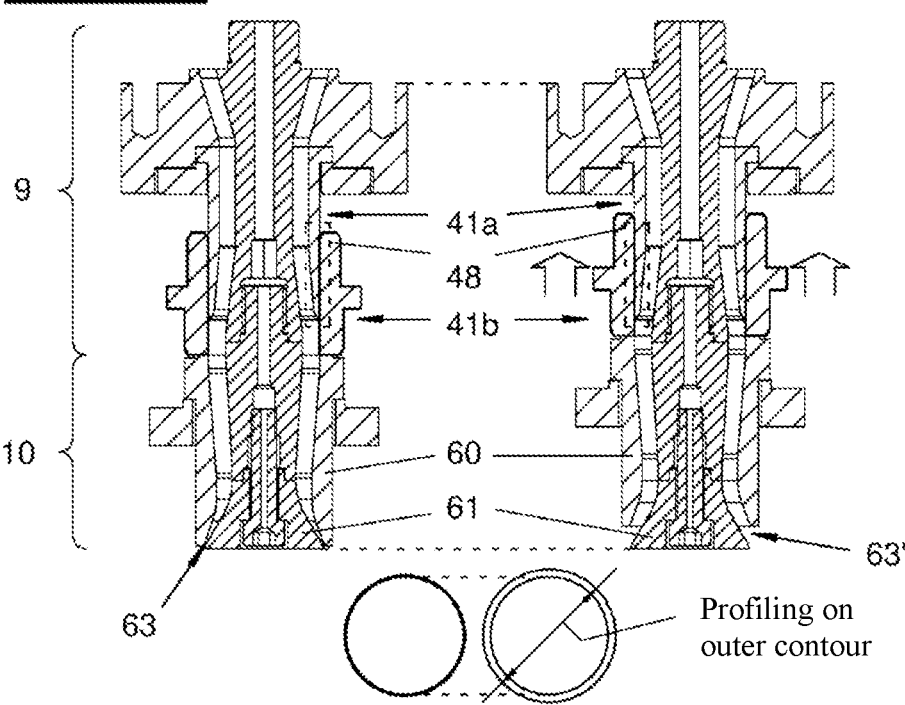
Fig. 11    Mandrel body movement
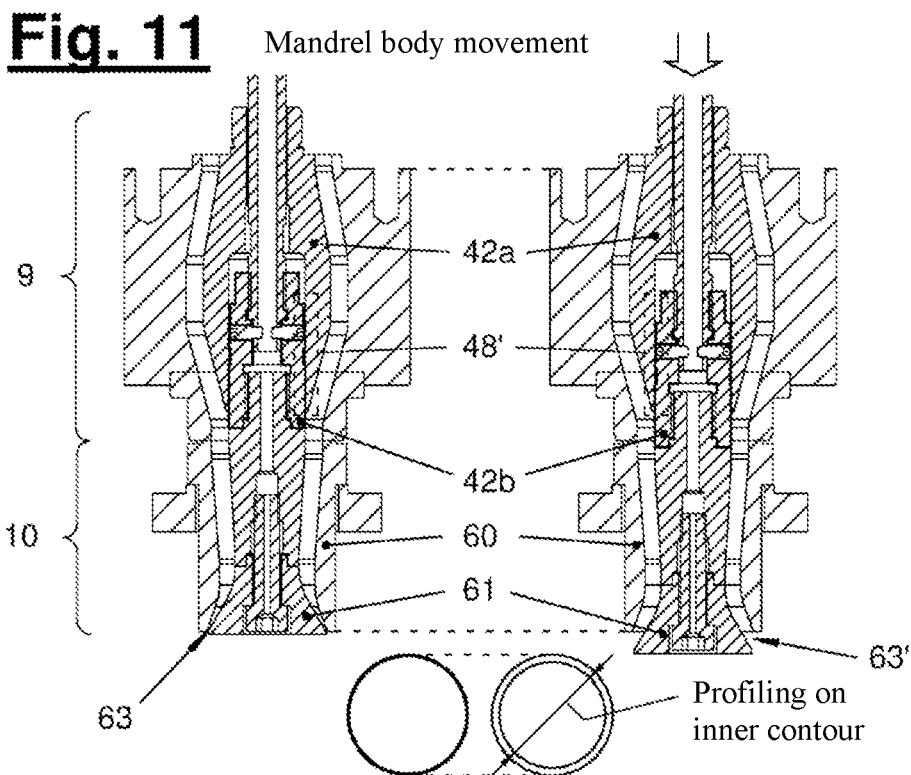

Profiling on outer contour

Profiling on inner contour

64

Fig. 22    Nozzle body movement

Fig. 23     Nozzle body movement

Fig. 24    Mandrel body movement

EXTRUSION TECHNIQUE FOR FORMING POLYMER PREFORMS, AND TUBE-FORMING TECHNIQUE

CROSS REFERENCE

The present Application for Patent claims priority to International Patent Application No. PCT/EP2020/079124 by Mielke et al., entitled "EXTRUSION TECHNIQUE FOR FORMING POLYMER PREFORMS, AND TUBE-FORMING TECHNIQUE", filed Oct. 15, 2020, which claims priority to German Patent Application No. 202019105681.9 by Mielke et al., entitled "EXTRUSION TECHNIQUE FOR FORMING POLYMER PREFORMS, AND TUBE-FORMING TECHNIQUE", filed Oct. 15, 2019, each of which is assigned to the assignee hereof, and each of which is expressly incorporated by reference in its entirety herein.

BACKGROUND

A polymer melt may be shaped using an extruder tool into tube-like preforms with a wall thickness profile (e.g., with locally variable wall thickness). The preforms can be further processed, for example, for the production of polymer bottles or polymer drums or other hollow bodies.

SUMMARY

The present disclosure relates to the technical field of tube formation from polymer melts for the purpose of extrusion.

In practice, shaping a polymer melt by means of an extruder tool into tube-like preforms with a wall thickness profile, i.e., with locally variable wall thickness, is known. The preforms can be further processed, for example, for the production of polymer bottles or polymer drums or other hollow bodies.

The extrusion techniques and extrusion devices known to date are not optimally designed. In particular, they have the disadvantage that, in the case of a material or color change, at so-called dead spots of the passages carrying melts, residues of the previously processed material remain. In the long term, after the change, these residues can lead to contaminations in or on the products produced. On the other hand, the extrusion techniques and extrusion devices known to date are each limited to a type of wall thickness variation.

The aim of the present disclosure is to indicate an improved extrusion technique. The examples described herein achieve this aim by the characterizing features of the independent claims.

The extrusion technique according to the present disclosure comprises multiple aspects which, each by themselves or in any combination, contribute to achieving the aim and in particular enable a rapid color or material change while avoiding or strongly reducing contaminations on the products produced and ensure universal usability of an extrusion device for the production of preforms having a tubular basic form. The disclosed extrusion technique comprises a melt receiving technique, a tube-forming technique, a profiling technique and a throttling technique. Each of these techniques comprises a device and an associated process.

The extrusion technique also comprises device features and process features. Below, the device features and the process features of the respective techniques are described together. In each case, a property, a design or suitability disclosed for a respective device feature is also understood as a property, a process or an effect of the associated process feature and vice versa.

One aspect of the disclosure relates to a melt receiving device on an extrusion device or for an extrusion device or to a melt receiving process as part of an extrusion process. The melt receiving device has a hollow guide body, in the cavity of which a melt passage is formed. A polymer melt can be or is introduced into the hollow guide body from one side (inlet side) in a flow direction. In the cavity, a stirring body, which converges to a point in the flow direction of the polymer melt, is arranged, which stirring body can be or is rotated about a rotation axis. On the inlet side of the melt receiving device, between the guide body and the stirring body, the melt passage has a cross section in the shape of an annular gap. On the outlet side of the melt receiving device, the melt passage has a full-surface cross section.

The stirring body has a tip arranged eccentrically relative to the rotation axis. Due to the eccentricity of the tip, during a rotation of the stirring body, an additional mixing in the transition region between the annular gap and the full-surface cross section is generated, so that the formation of a so-called dead water zone is greatly reduced or avoided.

A dead water zone is a local volume region in which a local low-pressure zone is present. Dead water zones commonly form in the flow direction of a fluid behind a body surrounded by flow or, in the case of strong redirections of a fluid passage (here the melt passage), on the exterior curvature. In the case of polymer melts, the formation of a dead water zone can lead to some portions of the melt depositing or accumulating there. They can in particular be portions with a lower viscosity or a relatively elevated lubricity. As a result of such deposits, downstream of the dead water zone, an inhomogeneity of the polymer melt can be brought about, which, in the extruded workpiece, can correspondingly bring about locally different material properties such as, for example, different colorations, different elasticities, different porosities, etc.

In the region lying before the tip in the flow direction, the stirring body has a spherical or oval cross section, or a cross section with at least six corners (hexagon, heptagon, octagon, etc.). In particular, the stirring body can have a first section in the flow direction, which has the shape of a truncated cone or truncated prism, and a second section which has the shape of a pointed cone or of a pointed pyramid, wherein the apex of the cone or pyramid is the tip of the stirring body. Accordingly, the second body is preferably designed as an eccentric cone or an eccentric pyramid. The base of the truncated pyramid and/or of the pyramid preferably has at least six corners.

In the case of the at least six-cornered cross-sectional shape, the formation of dead water zones is already considerably reduced in comparison to a cross-sectional shape having, for example, 4 corners.

Due to the melt receiving device according to the present disclosure or due to the melt receiving process, an improved quality of the plastic articles and an increased process quality are thus achieved.

The melt receiving process is provided for receiving a polymer melt on an extrusion device and comprises the following steps: providing a melt receiving device with a hollow guide body and a stirring body arranged in the cavity of the guide body; supplying the polymer melt in a melt passage on the inlet side of the receiving device between the guide body and the stirring body, wherein the melt passage there has a cross section in the shape of an annular gap; guiding the polymer melt through the melt passage to an outlet side of the melt receiving device; rotating the stirring body, wherein the stirring body has an eccentric tip and the stirring movement of the eccentric tip homogenizes the melt stream directly downstream of the stirring body.

An additional aspect of the disclosure relates to a tube-forming device for an extrusion device and respectively to an associated tube-forming process. The tube-forming process is provided for shaping a stream of polymer melt and comprises the following steps: providing a tube-forming device (8) with at least one shaping sleeve; supplying the stream of polymer melt with a substantially strand-like cross section to an inlet side of the at least one shaping sleeve; shaping the melt stream within the at least one shaping sleeve into a tubular cross section.

The tube-forming device correspondingly comprises at least one shaping sleeve which is designed or used to shape a supplied stream of polymer melt from a substantially strand-like cross section into a tubular cross section. The shaping sleeve preferably has a guiding passage which is embedded in the sleeve wall of the shaping sleeve, i.e., is arranged in an intermediate region between an inward facing boundary contour of the shaping sleeve and an outward facing boundary contour of the shaping sleeve. The guiding passage is a cavity which lies within the sleeve wall and, in the radial direction of the shaping sleeve, is enclosed in a sealed manner with respect to the outer surfaces. The guiding passage is thus enclosed within the wall body of the shaping sleeve.

According to an alternative example, at least two adjacent shaping sleeves or shaping sleeves having a multi-part design can be present, in which a guiding passage is formed between two separate walls. There, the passage is thus not embedded in a wall but formed in the clearance between two separate walls of separate bodies. In other words, in the alternative and previously known shaping sleeves, a guiding passage lies in the separation plane between two adjacent bodies, wherein the outer contours of these adjacent bodies form the boundary surfaces of the guiding passage.

In the shaping sleeve according to the present aspect of the disclosure, on the other hand, the guiding passage is formed by the inner contours of a single body.

By embedding a guiding passage in the sleeve wall, within the wall of the tube-forming device, grooves extending parallel to the flow direction of the introduced polymer melt can be largely or completely avoided. On or in such grooves, in previously known tube-forming devices, deposits or sediments, in particular deposits or secretions of melt components having a lower viscosity or increased wall adhesion, form to an increased extent. Such deposits or secretions can occasionally become detached again— analogously to the above explanations concerning dead water zones. Due to the formation and the renewed detachment of such deposits or accumulations from grooves, local inhomogeneities in the polymer melt can be generated, which can lead to the aforementioned parasitic effects in the final product.

A tube-forming device or a tube-forming process according to the present aspect thus also contributes to an improved production quality and process quality. It facilitates in particular a rapid color or material change.

An additional aspect of the present disclosure relates to a profiling device for an extruder unit or an extrusion device and respectively to an associated profiling process. The profiling (wall thickness change) is provided and designed to locally vary a wall thickness of a preform to be produced, in particular to introduce thickenings or thinnings of the wall thickness in some sections.

The profiling device has a continuous melt passage and is designed to receive a stream of polymer melt with a tubular cross section on the inlet side and also to dispense a stream of polymer melt with a tubular cross section on the outlet side. The profiling device has a base body with an outer portion and an inner portion between which the melt passage is formed. The outer portion and the inner portion on the inlet side each have separate fastening structures. Said fastening structures are designed, on the one hand, to connect the outer portion to an outer section of a tube-forming device (located upstream of the polymer melt in the flow direction) and, on the other hand, to connect the inner portion to an inner section of the tube-forming device. On the outlet side, the outer portion and the inner portion have additional respectively separate fastening structures. Said fastening structures are designed, on the one hand, to connect the outer portion to a nozzle body of a dispensing tool and, on the other hand, to connect the inner portion to a mandrel body of the dispensing tool.

The base body here has at least one sliding section which is designed to lengthen or shorten the outer portion or, on the other hand, to lengthen or shorten the inner portion, so that a relative position of the outlet-side fastening structures can be set. The lengthening or shortening preferably occurs in axial direction of the melt passage or in axial direction of the profiling device and causes a movement of the dispensing tool which results in the actual wall thickness variation.

Since, in the outlet-side fastening structures, on the one hand, the nozzle body and, on the other hand, the mandrel body of a dispensing tool can be or is arranged, in the case of a change of the relative position of the outlet-side fastening structures, a relative position between nozzle body and mandrel body is also preferably varied. This results (directly or indirectly) in a corresponding varied width of the annular gap through which the polymer melt exits on the outer front side of the dispensing tool and therefore in a temporary increase or decrease of the melt volume exiting per unit of time, which results in the desired increased or decreased wall thickness of the preform.

The profiling device according to the present disclosure has the advantage that, depending on the design of the changeability of the length on the outer portion, or on the inner portion, or on the outer portion and the inner portion, using the same dispensing tool, as desired, a profiling exclusively by a nozzle body movement, a profiling exclusively by a mandrel body movement, or a profiling by a combination of a nozzle body movement and a mandrel body movement is enabled. Thus, it is not necessary to design the dispensing tool or the nozzle body or the mandrel body in particular for a profiling type. The dispensing tool can therefore have a simplified design. The profiling device can be combined with a plurality of differently shaped dispensing tools which, for example, are provided for different types of preforms, wherein a rapid and simple tool change is enabled. In the case of a tool change, in particular, no extensive draining of the melt passage may be used. Accordingly, the melt stream can continue to advance already after a brief setup time interruption so that the risk of demixing processes due to residence time is reduced.

Accordingly, the profiling device or the profiling method according to the present disclosure also contributes to an improvement of the melt homogeneity and an associated improved production quality.

An additional aspect of the present disclosure relates to a throttling device for an extrusion device or an extruder unit and respectively to an associated throttling process. The throttling device comprises one or more throttle pins, the respective dorsal end of which can be introduced into a melt passage of the extrusion device or of the extruder unit, in order to reduce the throughflow cross section of the melt passage. A reduction of the throughflow cross section leads to a reduction of the volume flow of a polymer melt which flows through the respective melt passage on the throttle pin. At least one throttle pin is supported or fixed at the distal end in axial direction of the throttle pin on a movable guiding element. The at least one guiding element in turn is supported on a movable setting means in a region which is transversely offset with respect to the axial direction of the throttle pin, such that a movement of the setting means by the guiding element can be or is converted into an axial movement of the throttle pin. The setting means can thus be arranged at least with a lateral offset relative to the throttle pin.

The throttling process according to the present disclosure is provided to influence the volume flow of a polymer melt flowing through a melt passage of an extrusion device or of an extruder unit. It comprises at least the following steps: providing a throttling device with one or more throttle pins, the respective dorsal end of which can be introduced into a melt passage of the extrusion device or of the extruder unit, in order to reduce the throughflow cross section of the melt passage. For at least one throttle pin: providing a movable guiding element and a setting means in such a manner that a movement of the setting means by the guiding element can be converted into an axial movement of the throttle pin; moving the setting means in order to increase or decrease the volume flow of the melt on the connected throttle pin. Preferably, for a plurality of throttle pins and in particular for each throttle pin, a movable guiding element and a setting element can be provided such that the respective volume flows of the polymer melts can be set in a simple way by a movement, in particular by a screwing movement, of the setting element.

According to an example, the throttling device comprises at least two throttle pins and associated guiding elements and setting means. In this case, by appropriate selection and arrangement of the guiding elements, the setting elements can be brought into a relative position with respect to one another which is largely independent of the position of the throttle pins. Thereby, on the one hand, the accessibility and, on the other hand, the clarity of the arrangement of the throttle pins can be improved. Thus, erroneous operations due to poor accessibility of the setting elements or due to a mix-up can be counteracted. Moreover, a throttling device according to the present disclosure for two or more melt passages to be throttled can also be quickly installed and removed. Furthermore, during the production setup or in the case of a color or material change, a calibration of the throttling, which is a clearly faster and less error-prone calibration of the throttling is possible, such that here too the risk of demixing processes caused by the residence time is reduced. Accordingly, the throttling device according to the present disclosure also contributes to obtaining an improved possible homogeneity of the polymer melt and thus to achieving an improved production quality.

An additional aspect of the present disclosure relates to an extruder unit for producing preform lengths with a tube-like wall made of a polymer melt or to an associated process. The extruder unit can be singly or multiply arranged on an extrusion head and preferably comprises the components useful for or contribute to the reshaping the polymer melt into a preform.

The extruder unit has a dispensing tool with a hollow nozzle body and with a mandrel body which can be arranged or is arranged in the nozzle body. Between the inner contour of the nozzle body and the outer contour of the mandrel body, a melt passage with a tubular cross section is formed, which leads outward to an annular gap (on an outer front side of the dispensing tool). The extruder unit according to the present disclosure comprises a profiling device and/or a tube-forming device and/or a throttling device according to the present disclosure. According to an example, the extruder unit comprises at least two different profiling devices which can be alternatingly connected to the same dispensing tool and/or to the same tube-forming device. The multiple profiling devices here have at least two of the following design types:

1. design for profiling exclusively by a nozzle body movement (nozzle body is movable or moved relative to stationary mandrel body);
2. design for profiling exclusively by a mandrel body movement (mandrel body is movable or moved relative to stationary nozzle body);
3. design for profiling by combined or alternative nozzle body movement and mandrel body movement (mandrel body and nozzle body are actively movable or moved).

An extruder unit with such a plurality of exchangeable profiling devices makes it possible to perform the practically relevant types of profiling using just one dispensing tool. A profiling by a nozzle body movement is particularly advantageous when a standardized and interfering contour-free inner diameter of a preform is desired or when a particular surface quality on the inner contour is to be achieved. On the other hand, a profiling by mandrel body movement is advantageous when a standardized and interfering contour-free outer contour of a preform is desired or when a particularly high surface quality on the outer contour is desired. A combination of nozzle body movement and mandrel body movement is advantageous when particularly complex wall profiles are desired. Thus, a particularly broad usability of the extruder unit is achieved.

According to an example variant, the fastening structures of the multiple profiling devices have a matching interface geometry and thus form modules that can be freely combined with one another. Accordingly, standardized interface geometries are preferably also provided on the outlet side of two or more exchangeable tube-forming devices and/or on the inlet side of two or more exchangeable dispensing tools.

An additional aspect of the disclosure relates to an extrusion device which comprises at least one melt receiving device according to the present disclosure and an extruder unit according to the present disclosure which are connected via a melt passage.

The extrusion device preferably further comprises a movement device which is designed to actuate at least one and preferably multiple profiling devices of the extruder unit. Alternatively or additionally, the movement device can be designed to actuate two of the following design types of profiling devices, in particular alternately:

design for profiling exclusively by a nozzle body movement;

design for profiling exclusively by a mandrel body movement;

design for profiling by combined or alternative nozzle body movement and mandrel body movement.

Additional advantageous designs of the aspects according to the disclosure result from the dependent claims, the appended drawings as well as the following detailed description.

BRIEF DESCRIPTION OF THE DRAWINGS

The following is represented by way of examples and diagrammatically in the drawings. The drawings show:

FIGS. 8-11: cross-sectional representations of an extruder unit, on the one hand, with a profiling device for the nozzle body movement and, on the other hand, with a profiling device for the mandrel body movement;

DETAILED DESCRIPTION

Figure 1:
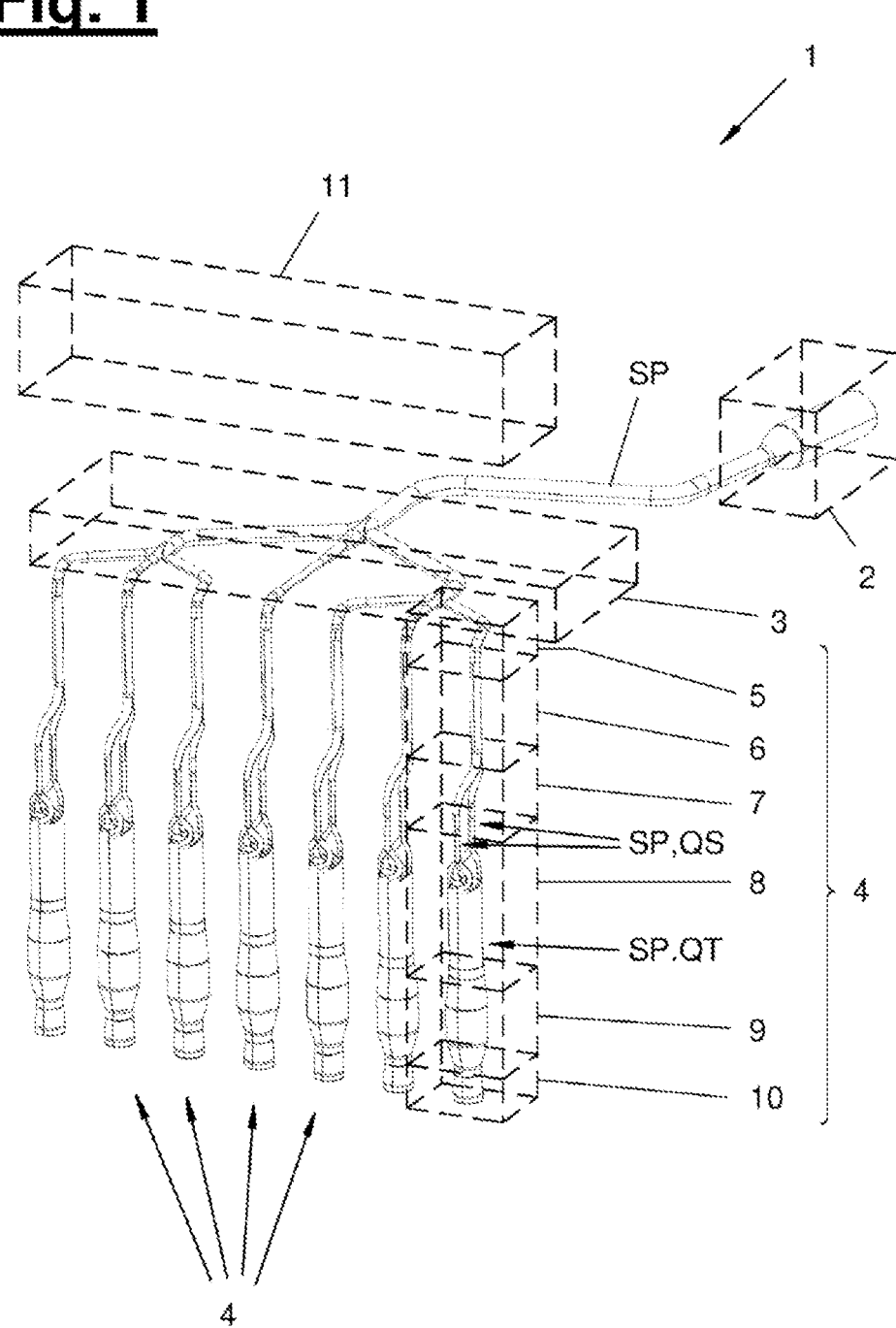
FIG. 1: The course of a branched melt passage through an extrusion device according to the present disclosure.

FIG. 1 shows a diagrammatic representation of the components of an extrusion device (1) according to the present disclosure, highlighting the melt passage (SP) through which a polymer melt is guided. In FIG. 1, the melt passage (SP) extends from a melt receiving device (2) through a distributor (3) and via a redirection (5) through a throttling device (6). Subsequently, the melt passage (SP) extends via a branching (7) through a tube-forming device (8), a profiling device (9) and the dispensing tool (10).

In the example of FIG. 1, the extrusion device (1) has an extrusion head (12) with a melt distributor (3) which divides a supplied melt stream into a total of 7 sub-streams, each supplied to a separate extruder unit (4). An extrusion head contains at least one preferably two or more extruder units (4). The extrusion head is preferably surrounded on the outlet-side end by a free space.

An extrusion device (1) according to the present disclosure and in particular its extrusion head (12) preferably has a modular design with standardized interfaces. As desired, the melt distributor (3) can have two, three, four, five, six, seven or any other number of dispensing melt passages (SP). Each melt passage (SP) leading away from the melt distributor (3) can be associated with exactly one extruder unit. Alternatively, on a melt passage leading away, a plurality of extruder units can be associated, which, for example, can be connected in a melt-conducting manner via a tool exchange device and operated simultaneously or alternatingly.

The multiple extruder units (4) can have the same design or a different design among themselves. On the outlet side with respect to an extruder unit, for example, a blow mold (so-called cavity, not represented) can be arranged or connected. In an injection mold, a preform can be expanded by introducing a pressurized fluid, until the polymer is in contact with the wall of the blow mold and thus receives its final shape (in the hot state). The blow mold is preferably designed as a negative mold for the intended final shape of the product to be produced (possibly in addition to a shrinkage stop).

The number of the extruder units (4) can be selected as desired. In particular, an extrusion device can have one, two, three, four, five, six, seven or any higher number of extruder units (4). The melt distributor (3) can correspondingly provide another number of branchings.

Below—purely for reasons of simplified representation—it is assumed that a plurality of extruder units (4) of matching design is present, each comprising a redirection (5), a branching (7), a tube-forming device (8), a profiling device (9) as well as a dispensing tool (10).

Each of the components of the extrusion device (1) or of an extruder unit (4) is designed to carry a stream of polymer melt and has a melt passage (SP) which is part of the overall melt passage (SP) shown in FIG. 1. Correspondingly, each component has an inlet side where a stream of polymer melt is or can be supplied, and an outlet side where the stream of polymer melt can be or is dispensed to a subsequent component or outward. The flow direction (FR) of the polymer melt extends from a melt supplying device (see FIGS. 4, 20 and 21) through a melt receiving device (2), optionally a melt distributor (3), optionally a redirection (5), preferably a throttling device (6), at least one tube-forming device (8), a profiling device (9) and a dispensing tool (10).

Additionally, a branching (7) can be provided, which is preferably arranged before a tube-forming device (8) or forms a component of the tube-forming device (8).

Figure 2:
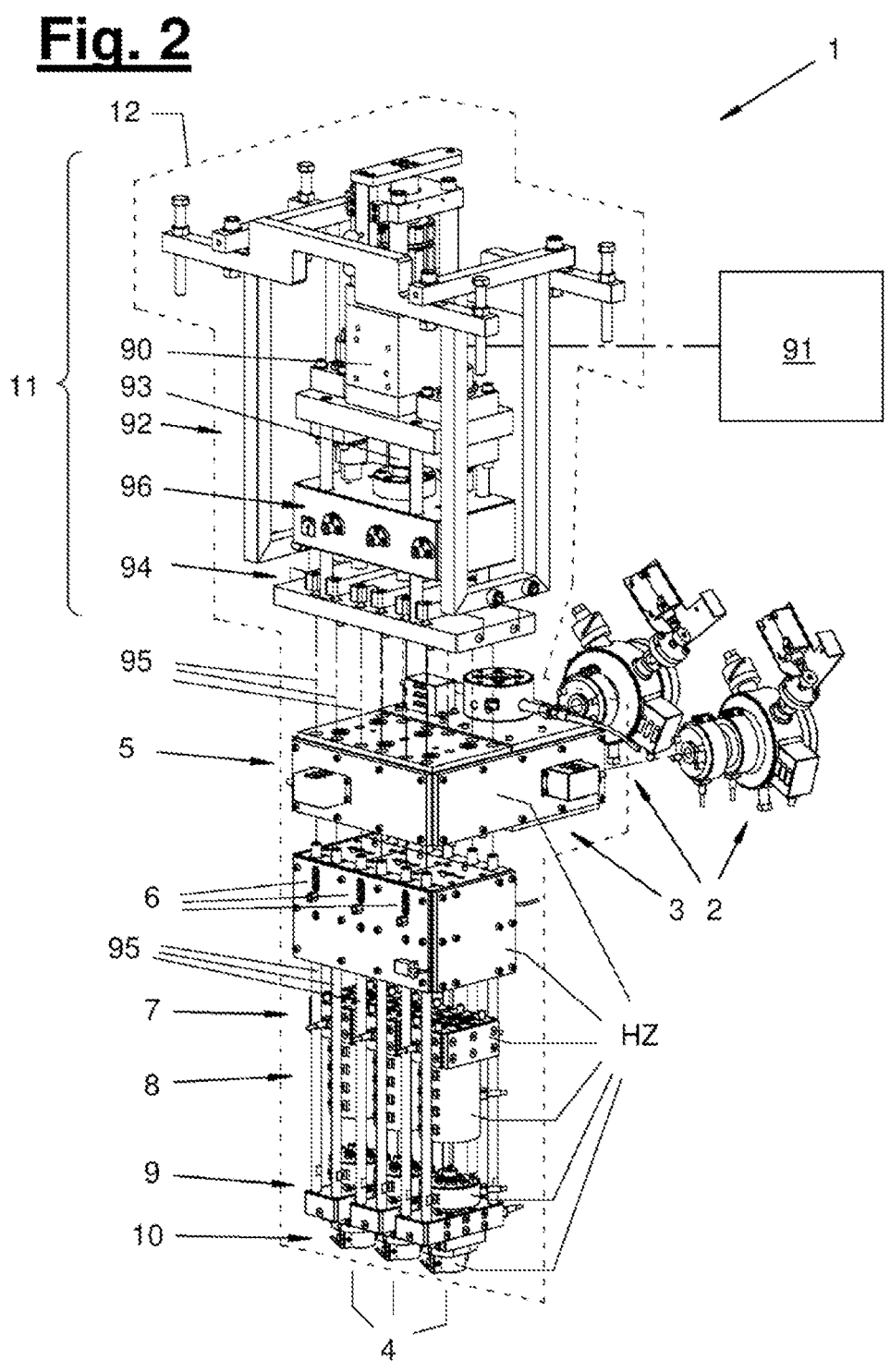
FIG. 2: an exploded representation of an extrusion device in a second example variant.

In FIG. 2, the aforementioned components of an extrusion device (1) are shown in an exploded representation. However, the extrusion device (1) represented here has three separate melt receiving devices (2) which are connected to three separately arranged melt passages (SP), in order to convey three different streams of polymer melt. Alternatively, two, four or another number of melt passages and streams of polymer melt can be provided.

In the example of FIG. 2, in the melt distributor (3), each of the melt passages (SP) branches into three substrands. Each substrand of each melt passage (SP) is supplied to an extruder unit (4). Within an extruder unit (4), a throttling device (6) is preferably provided, which is designed for throttling a respective sub-stream for each of the three melt passages.

In the tube-forming device (8), the three separate streams of polymer melt are guided and reshaped in such a manner that they receive a tubular cross section (QT) and are combined. The respective melt passages (SP) with tubular cross section (QT) here lie one inside the other in a shell-like manner and lead into a common layer forming section (28) (see FIGS. 6 and 7). After the combining, a melt passage with tubular cross section is present, in which the polymer melts are arranged overlapping one another in a shell-like manner and connected to one another. This collective melt stream is supplied to the profiling device (9) and the dispensing tool (10).

In the aforementioned example according to FIG. 2, three separate melt passages have been provided which correspondingly have taken the form of three streams of a polymer melt which surround one another in a shell-like manner in the tube-forming device (8). Alternatively, only two streams of polymer melt or another number of streams of polymer melt can be provided, which are reshaped into two or another number of melt streams surrounding one another in a shell-like manner.

Figure 3:
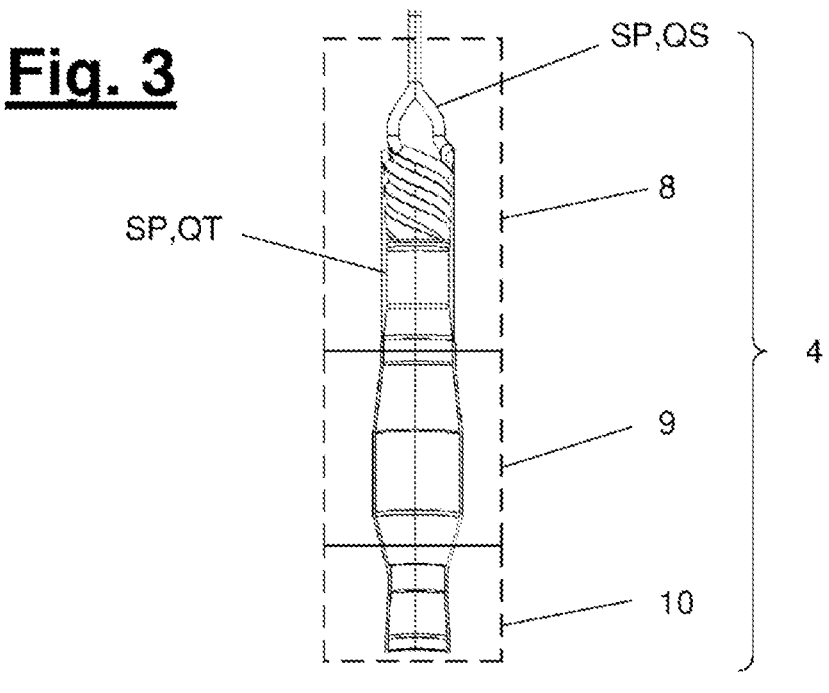
FIG. 3: an enlarged representation of a melt passage within an extruder unit.

FIG. 3 shows an enlarged cross-sectional view of a melt passage (SP) within an extruder unit (4) for a single stream of polymer melt. On the inlet side, the melt passage (SP) has a strand-like cross section which is optionally divided by a branching (7) into two or more subpassages. The polymer melt is supplied to a shaping section of the tube-forming device (8) and reshaped there into a melt passage (SP) with a tubular cross section (QT). According to FIG. 3, within the tube-forming device (8), two, three or more of the afore-mentioned melt passages (SP) with a tubular cross section (QT), which surround one another in a shell-like manner can be provided, melt passages which in the outlet region of the tube-forming device (8) are combined to form a collective stream.

Figure 4:
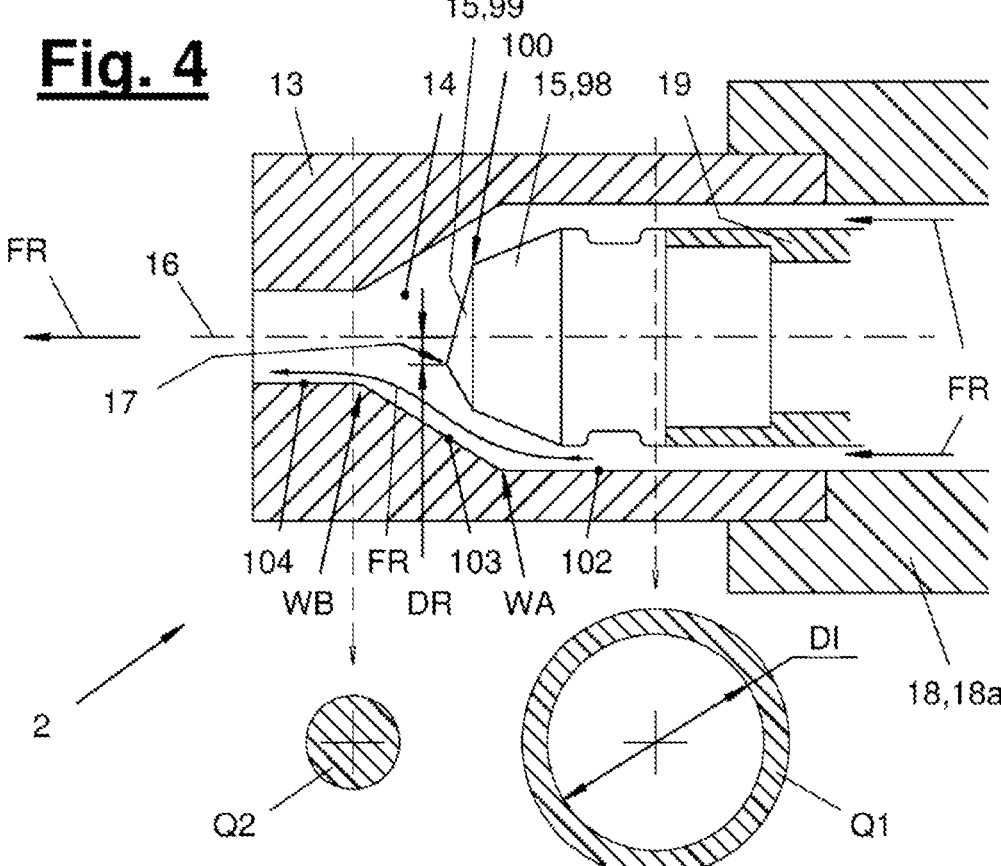
FIG. 4: a diagrammatic cross-sectional representation of a melt receiving device.
Figures 20, 21:
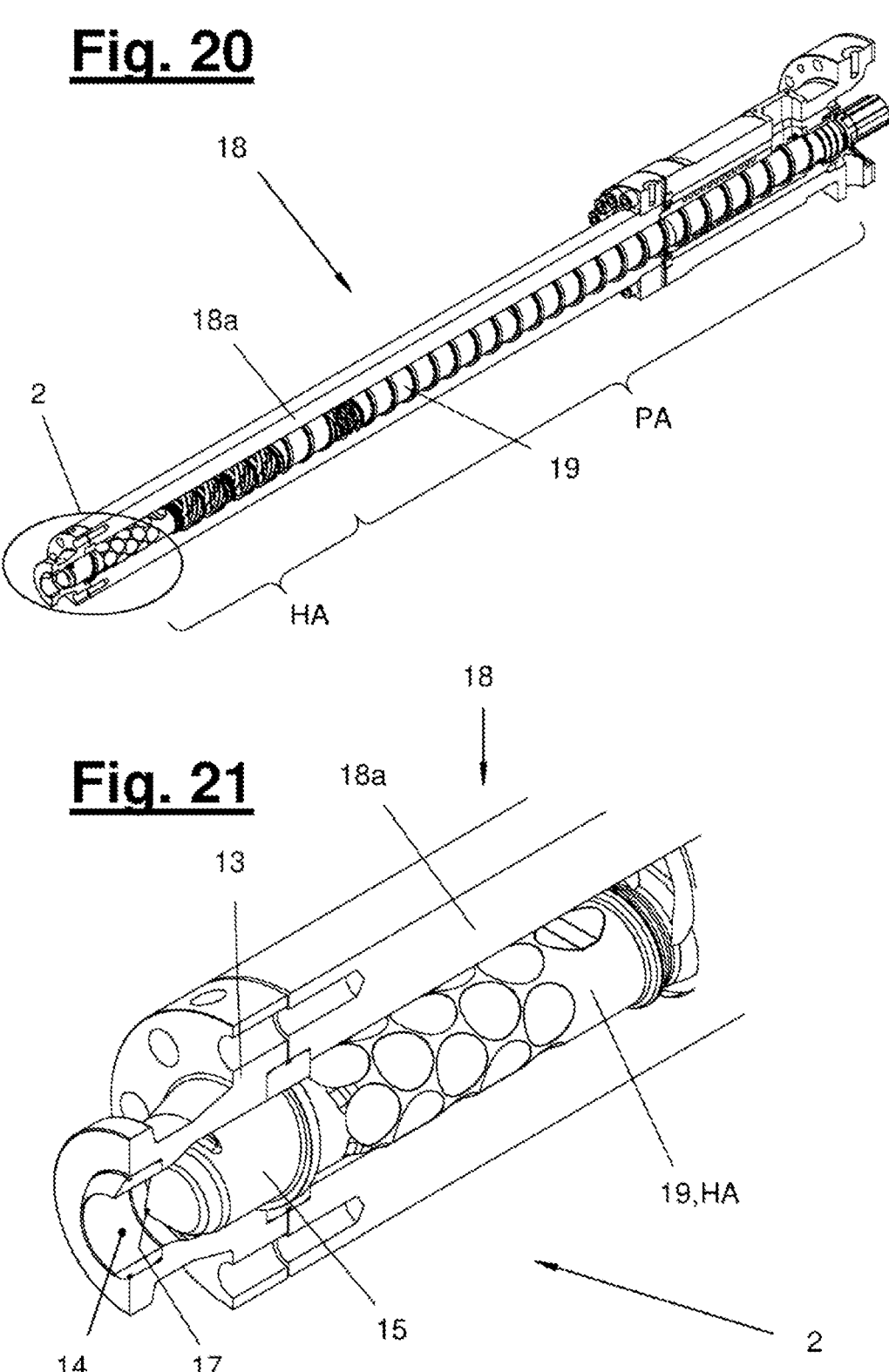
FIGS. 20-21: a perspective cross-sectional representation of a melt supplying device with integrated melt receiving device.
Figure 22:
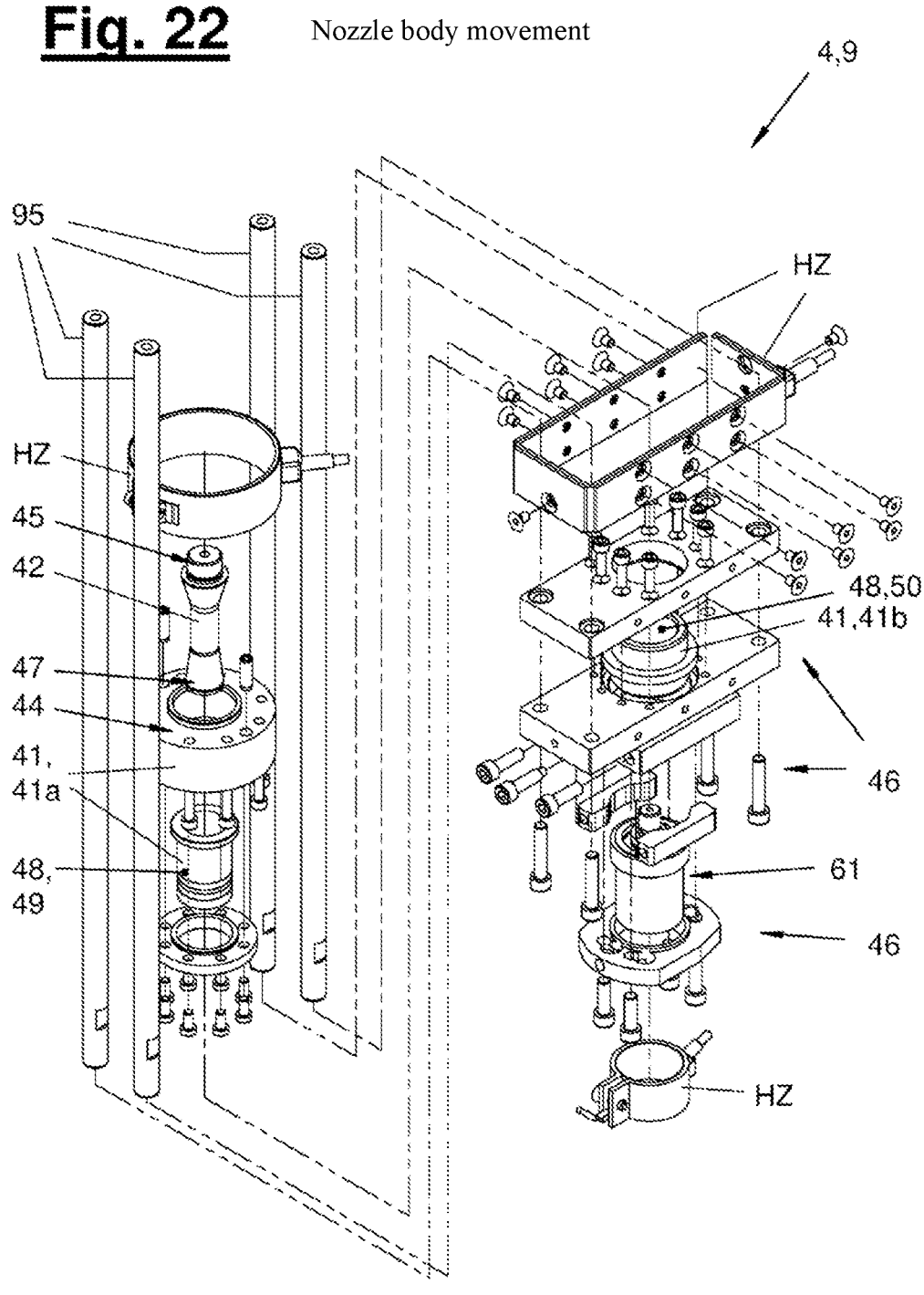
FIGS. 22-23: an exploded representation and an oblique view of a profiling device for the nozzle body movement with dispensing tool.
Figure 23:
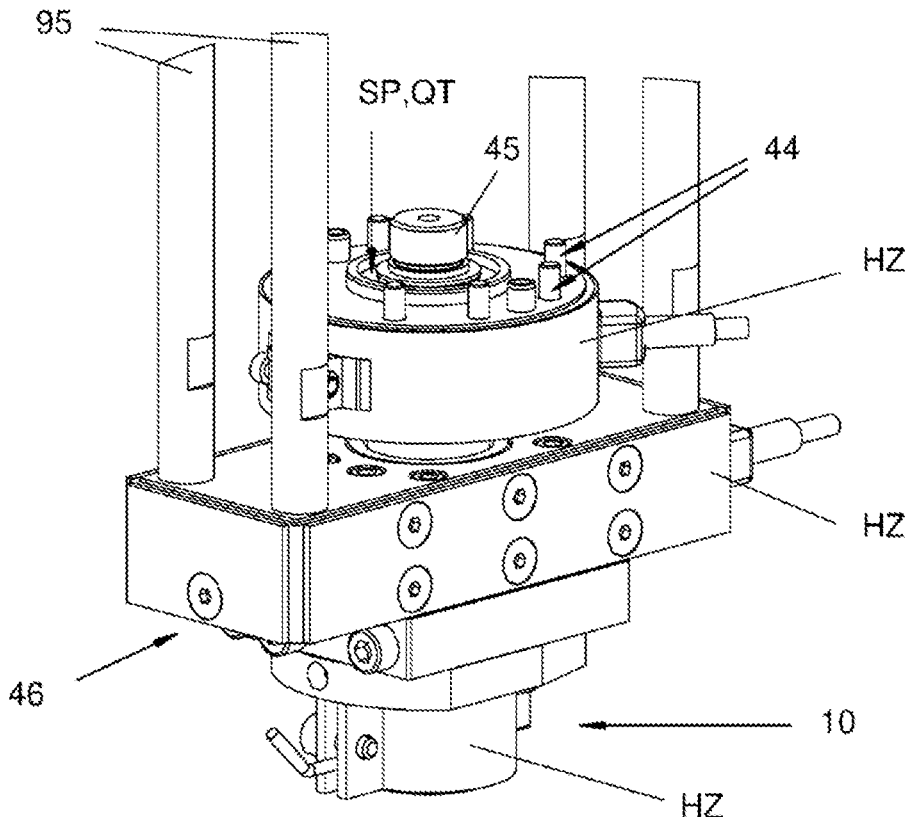
Figure 24:
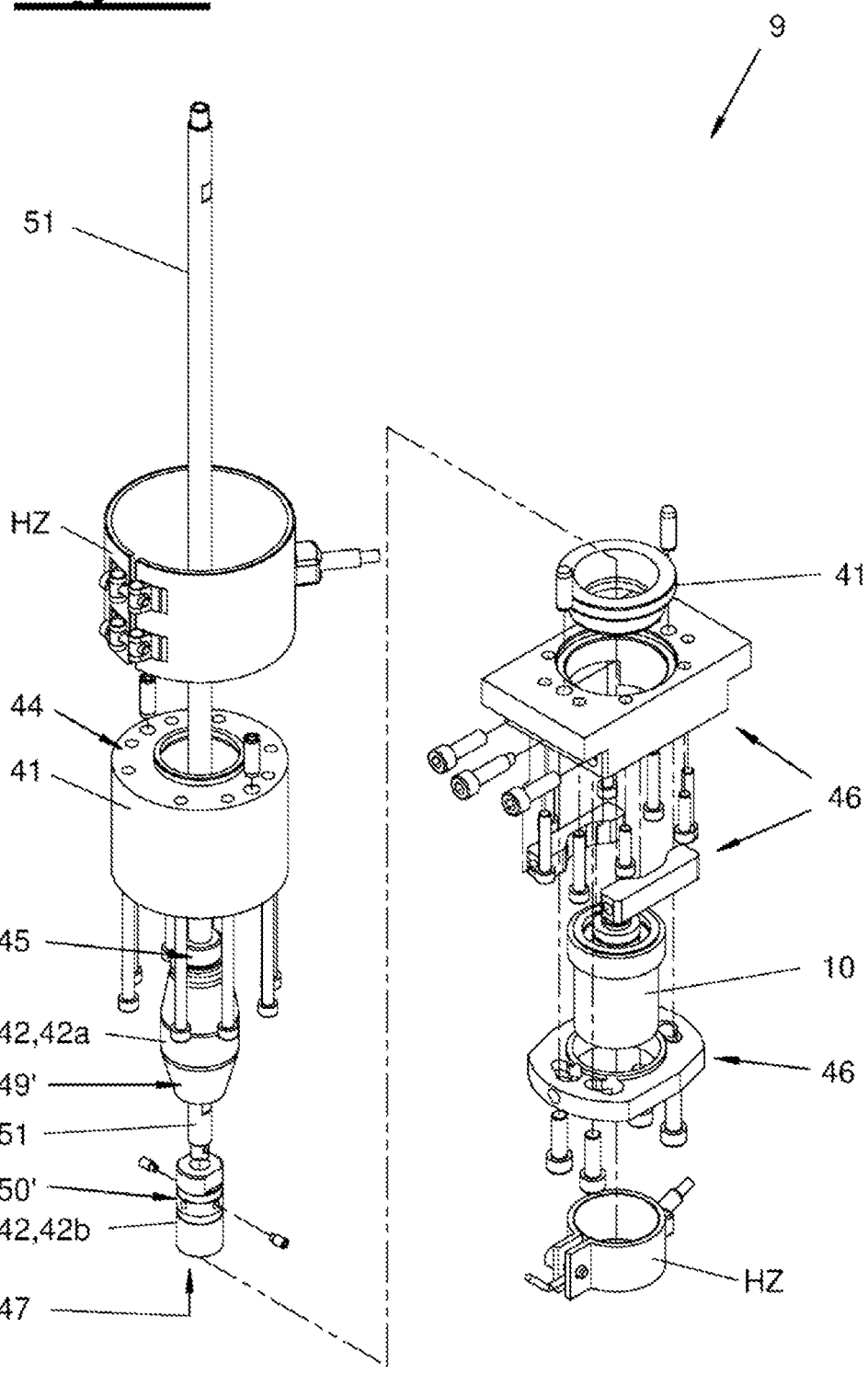
FIGS. 24-25: representations analogous to FIGS. 22 and 23, relating to a profiling device for the mandrel body movement.
Figure 25:
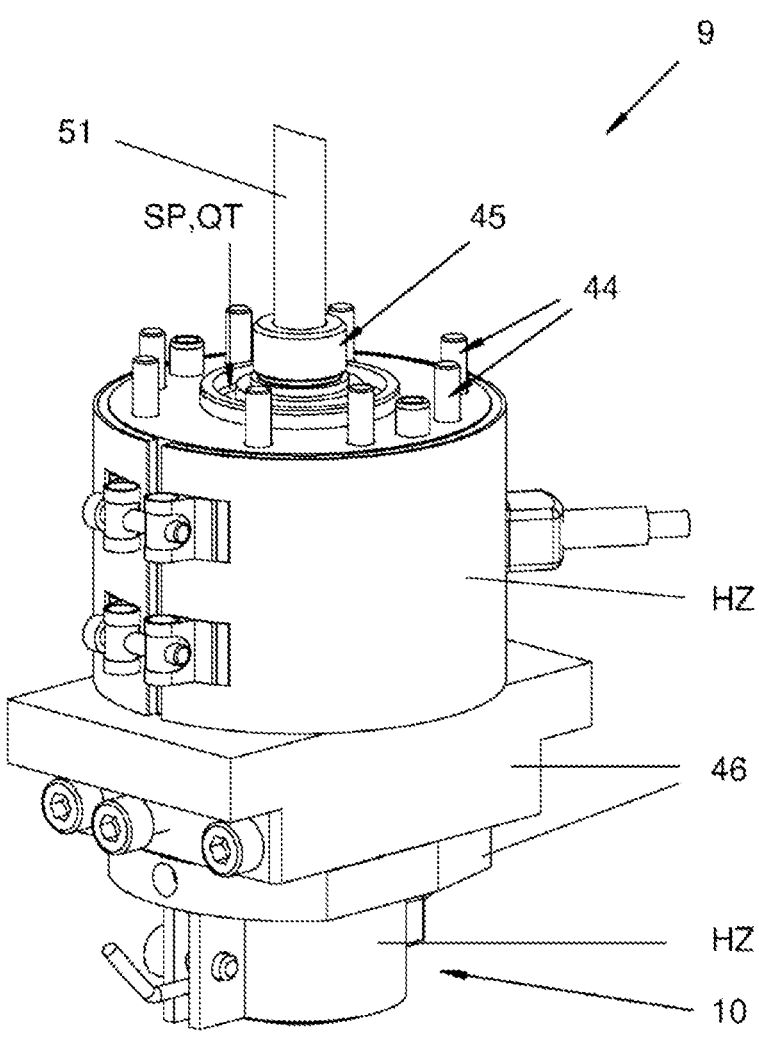
Figure 26:
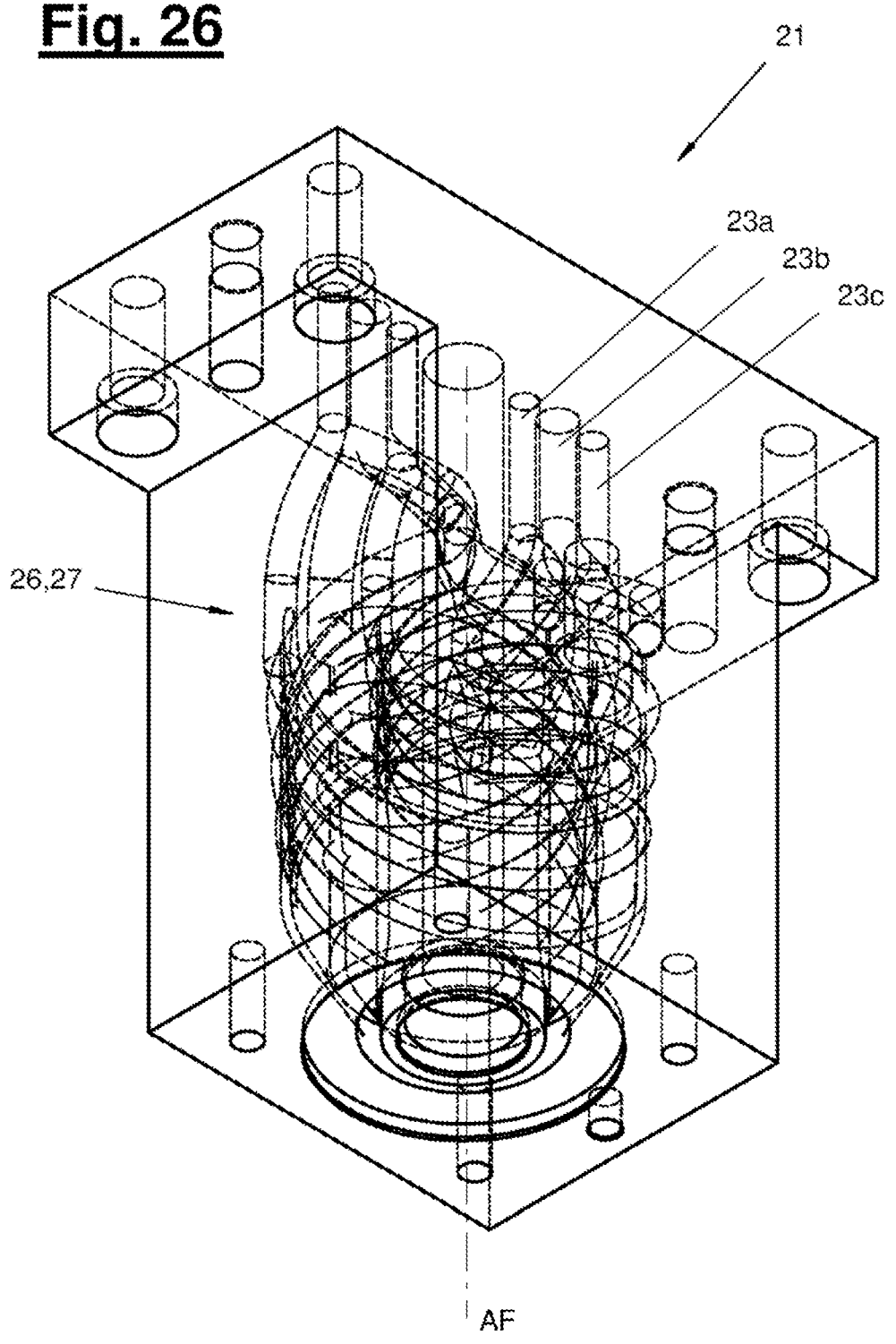
FIGS. 26-29: representations of a shaping sleeve of a tube-forming device with multiple melt passages embedded in the wall.
Figure 27:
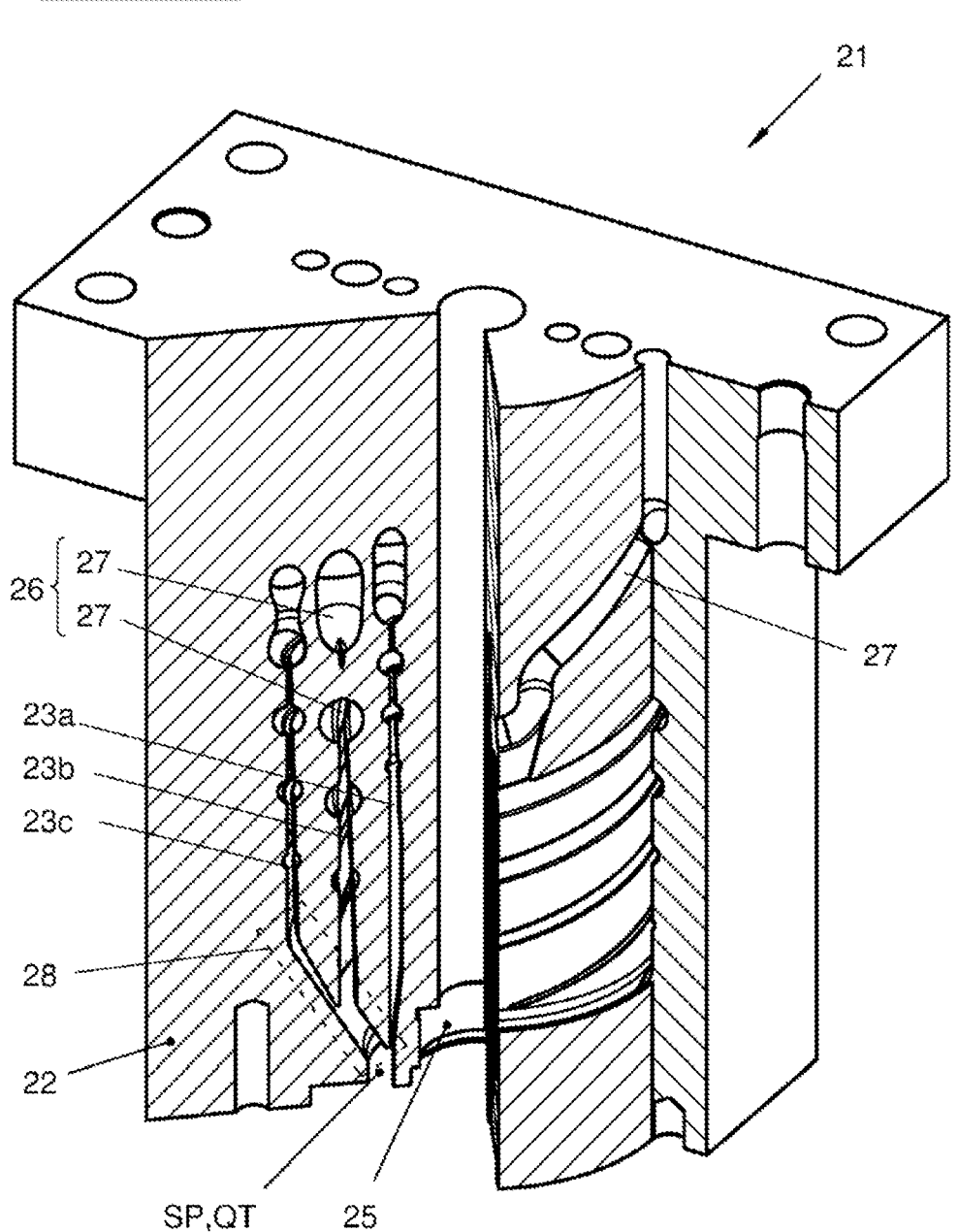
Figures 28, 29:
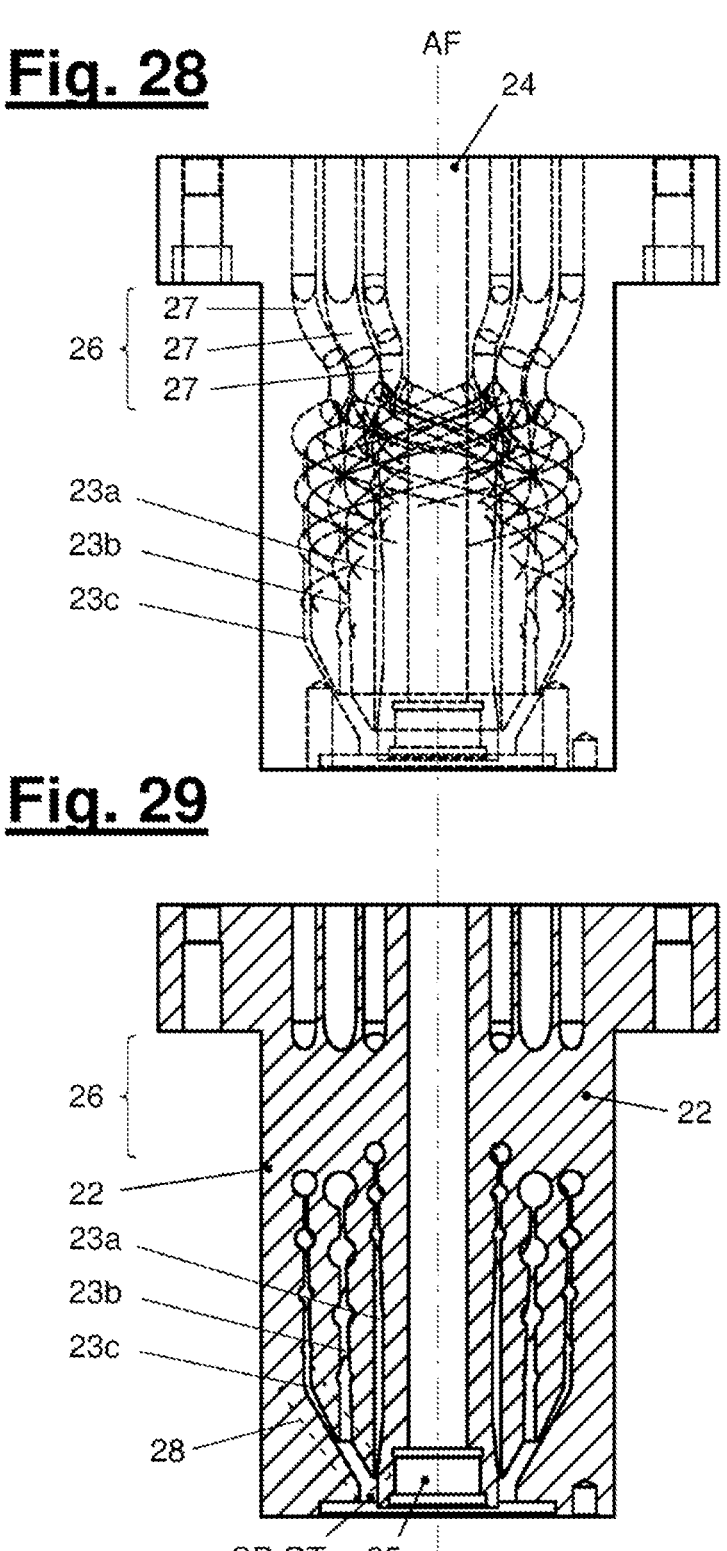

FIGS. 4, 20 and 21 show a melt receiving device (2) according to the present disclosure. Said receiving device comprises a hollow guide body (13), in the cavity (14) of which a melt passage (SP) is formed.

In the cavity (14), a stirring body (15) converging to a point is arranged. The stirring body (15) can be rotated about a rotation axis (16). The flow direction (FR) of the polymer melt is represented in each case from right to left in the representations.

The inner contour of the hollow guide body first has a wide cylindrical section (102) in the flow direction of the melt, in which a first portion of the stirring body (15) is arranged, as well as subsequently a funnel section in which at least an additional portion of the stirring body (15) is arranged. Downstream of the funnel section (103), the inner contour preferably moreover has a narrow cylindrical section which does not overlap with the stirring body (15). In the wide cylindrical section (102), the conveyor worm (19) can also be arranged.

On the inlet side, between the guide body (13) and the stirring body (15), the melt passage (SP) has a cross section (Q1) in the form of an annular gap. On the outlet side of the receiving device (2), i.e., entering the narrow cylindrical section, the melt passage (SP) has a full-surface cross section (Q2), in particular a full circle section.

In the flow direction, between the wide cylindrical section (102 and the funnel section (103) AND/OR between the funnel section (103) and the narrow cylindrical section (104), angle transitions (WA, WB) are preferably provided, which bring about a redirection of the flow direction (FR) by at most 45° (angular degree), in particular less than 30° (angular degree)—see FIG. 4. In this way, dead water zones on the outer circumference of the melt stream are avoided.

Figure 30A:
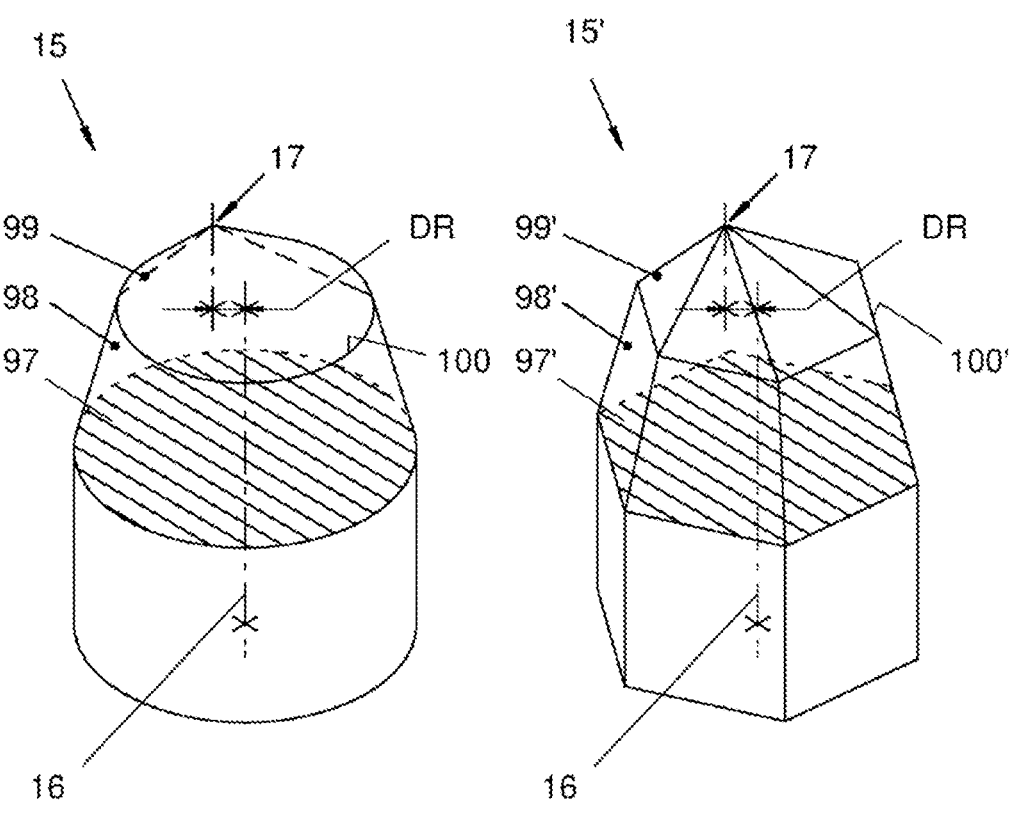
FIGS. 30A and 30B: example variants of a stirring body represented individually, in an oblique view above, in a top view along the rotation axis below.
Figure 30B:
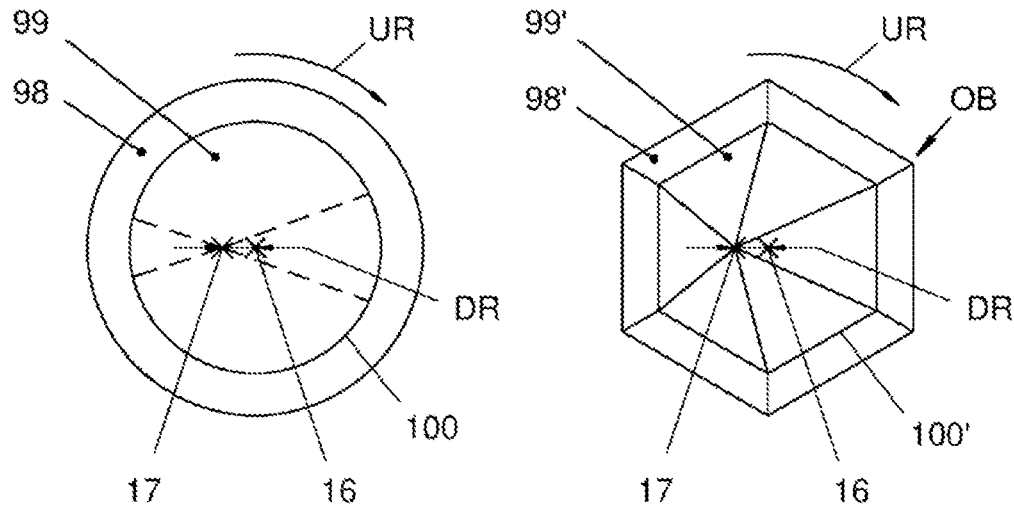

The stirring body (15, 15') has a spherical or oval cross section or a cross section with at least six corners. FIGS. 30A and 30B show examples of the stirring body (15, 15') in the upper area in an oblique view representation and below in a top view along the rotation axis (16).

The end section (second section) of the stirring body (15, 15') has the eccentric tip (17) which is designed as apex of an eccentric cone (99) or of an eccentric and preferably at least 6-sided pyramid (99'). In the flow direction upstream, an additional section (first section) of the stirring body (15, 15') is formed, which preferably has the shape of a truncated cone (98) or of a preferably at least 6-sided truncated pyramid (98'). The base surface/cross-sectional surface (27) of the stirring body (15) or of the eccentric cone (99) and of the truncated cone (98) is oval or round. The base surface/cross-sectional surface (27) of the stirring body (15') or of the eccentric pyramid (99') and of the truncated pyramid (98') is a polygon and has at least six corners.

By the spherical or oval cross section (27, 27') of the stirring body (15) or the at least one 6-cornered cross section, obtuse angled surface transitions (OB) in circum-ferential direction (UR) of the stirring body (15') are gen-erated or respectively acute angled surface transitions are avoided. It has been shown that, in the case of acute-angled surface transitions, dead water zones can form in the side region of the stirring body (15, 15'), which are located formed in the circumferential direction (UR) following the acute-angled transition. Such dead water zones are nearly completely avoided or considerably reduced in the stirring body (15, 15') according to the present disclosure.

The stirring body (15) is oriented in such a manner that its end which converges to a point or the tip (17) is arranged on the site located downstream. In other words, the stirring body (15) has (exactly) one rear region which converges to a point in the flow direction of the polymer melt, the end section of said region forming the "tip" (17). As explained above, by the rotation of the eccentrically arranged tip (17), the formation of a dead water zone directly following the stirring body (15, 15') is avoided or prevented.

The radial spacing (DR) of the tip (17) with respect to the rotation axis (16) is preferably at least 7.5%, in particular 10-15% of the inner diameter (DI) of the annular gap (17).

The radial spacing (DR) should also not be selected to be excessively large, in particular it should not be more than 20% of the inner diameter (DI) of the annular gap (17), since otherwise the effect of the eccentricity decreases.

The design of the stirring body (15, 15') with a first section (98, 98') and a second section (99, 99') makes it possible to provide, before reaching the tip (17) in the flow direction of the melt and at the transition between the first and the second sections, a circumferential edge (100, 100') which locally narrows the annular melt passage (SP) and thus leads to a local compression and therefore to a relative low pressure zone in the flow course directly after the edge (100, 100'). This low pressure zone is not formed homoge-neously due to the rotation of the stirring body (15, 15') and the eccentric shape of the second section, but instead it has locally higher and lower pressure levels which are shifted in accordance with the rotation of the stirring body. On the other hand, the circumferential edges (100, 100') preferably lie in the flow direction at the level of or directly going into the funnel section (103) of the guide body (13)—see FIGS. 4 and 30A, 30B.

It has been shown that the combination of the eccentric tip of the stirring body with the edge (100, 100') arranged upstream with respect to the tip in the flow direction promotes a particularly good detachment behavior of the melt, such that, in the case of a change from a first melt material to a second melt material, the waiting times are short time periods, during which a mixture which comprises both the first melt material and the second melt material is dispensed. Thus, changes in the configuration of a produc-tion process can be carried out with particular short exchange times and a minimization of the material-related rejects.

Providing a first section (98, 98') with the shape of a truncated pyramid or a truncated cone downstream with respect to the second section (99, 99') in the flow direction leads to a gentle redirection of the melt during the passage of the stirring body (15). This effect can be positively supplemented with the gentle redirection of the melt stream on the funnel section (103). Thus, the fluid-conducting transition from the annular gap (cross section Q1 in FIG. 4) into the full-surface passage cross section (cross section Q2 in FIG. 4) can occur overall free of dead water zones.

The melt receiving device (2) is preferably connected on the inlet side to a melt supplying device (18) or integrated in the melt supplying device (18). This is explained in FIGS. 20 and 21. The melt supplying device (18) can have any design. In particular, it can comprise a conveyor worm or extruder worm (19), by means of which the polymer melt is exposed to a feed pressure and moved. In the example of FIGS. 20 and 21, a multizone worm is shown, which represents an example variant. It has a plasticizing section (PA) and a homogenizing section (HA). On the inlet side of the melt supplying device (18), for example, a granular plastic material can be supplied, which is melted, mixed and conveyed along the worm (19). The granular plastic material can be a mixture of different plastics, dying means and possible additives.

The stirring body (15) is preferably connected and in particular inserted or integrated on the outlet side or on the end-side section of the worm (19) in the flow direction (FR) of the polymer melt. In this way, a rotation of the worm (19) can bring about the rotation of the stirring body (15).

FIGS. 6 to 7 and 26 to 29 show various example variants of a tube-forming device (8). The tube-forming device (8) comprises at least one and preferably multiple shaping sleeves (21*a*, 21*b*, 21*c*) which are designed to shape a supplied stream of polymer melt from a substantially strand-like cross section (QS) into a tubular cross section (QT). For this purpose, guiding passages (23) are provided, which delimit the outer contour of the melt passage (SP).

Figure 5:
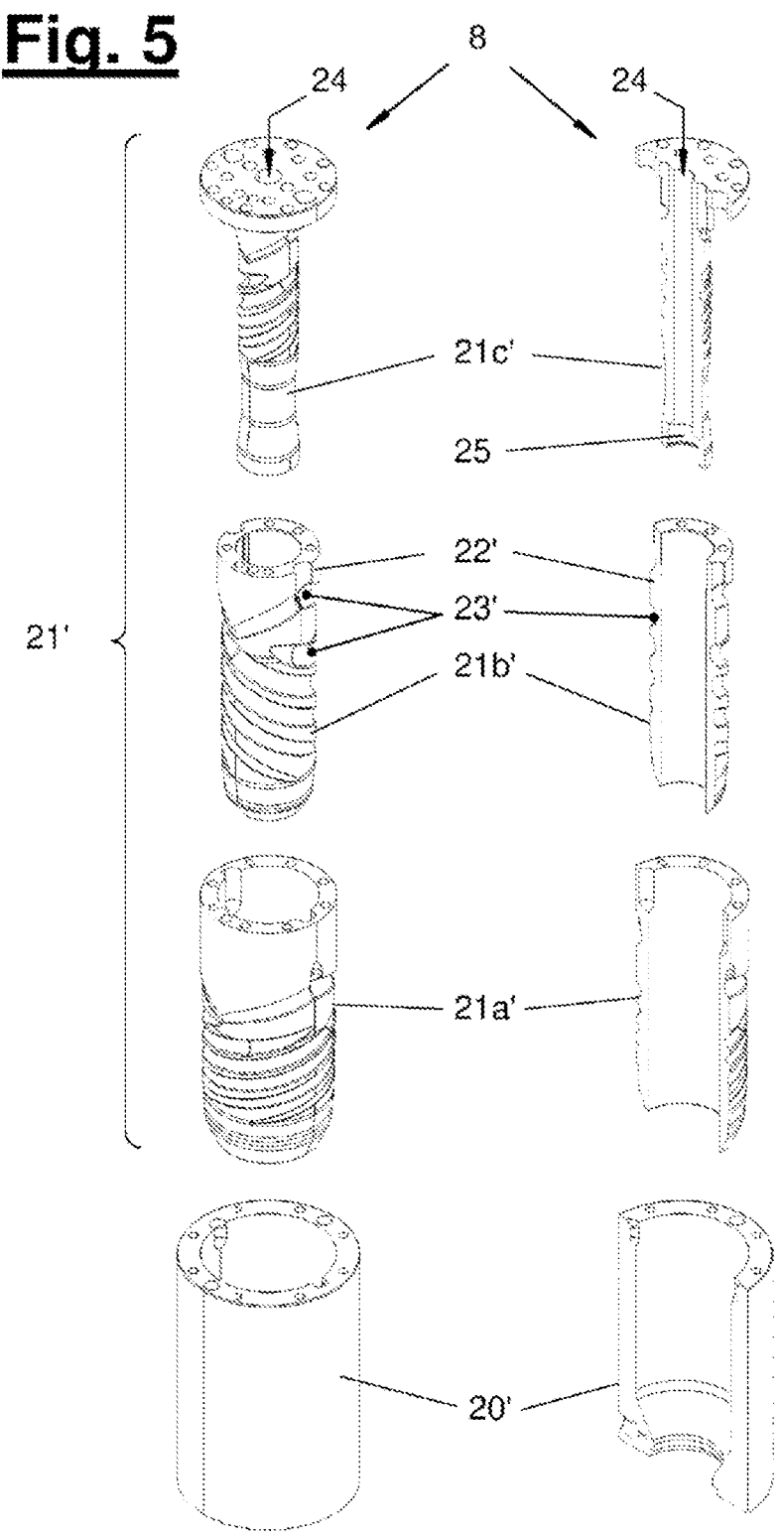
FIGS. 5-6: an exploded representation and a cross-sectional representation of a tube-forming device.

FIG. 5 shows an exploded representation of three shaping sleeves (21*a'*, 21*b'*, 21*c'*) according to an alternative and previously known example variant, in which the shaping sleeves (21*a'*, 21*b'*, 21*c'*) can be inserted or received in a housing (20'). The inner wall of the housing (20') here forms a portion of a guiding passage (23').

Figure 6:
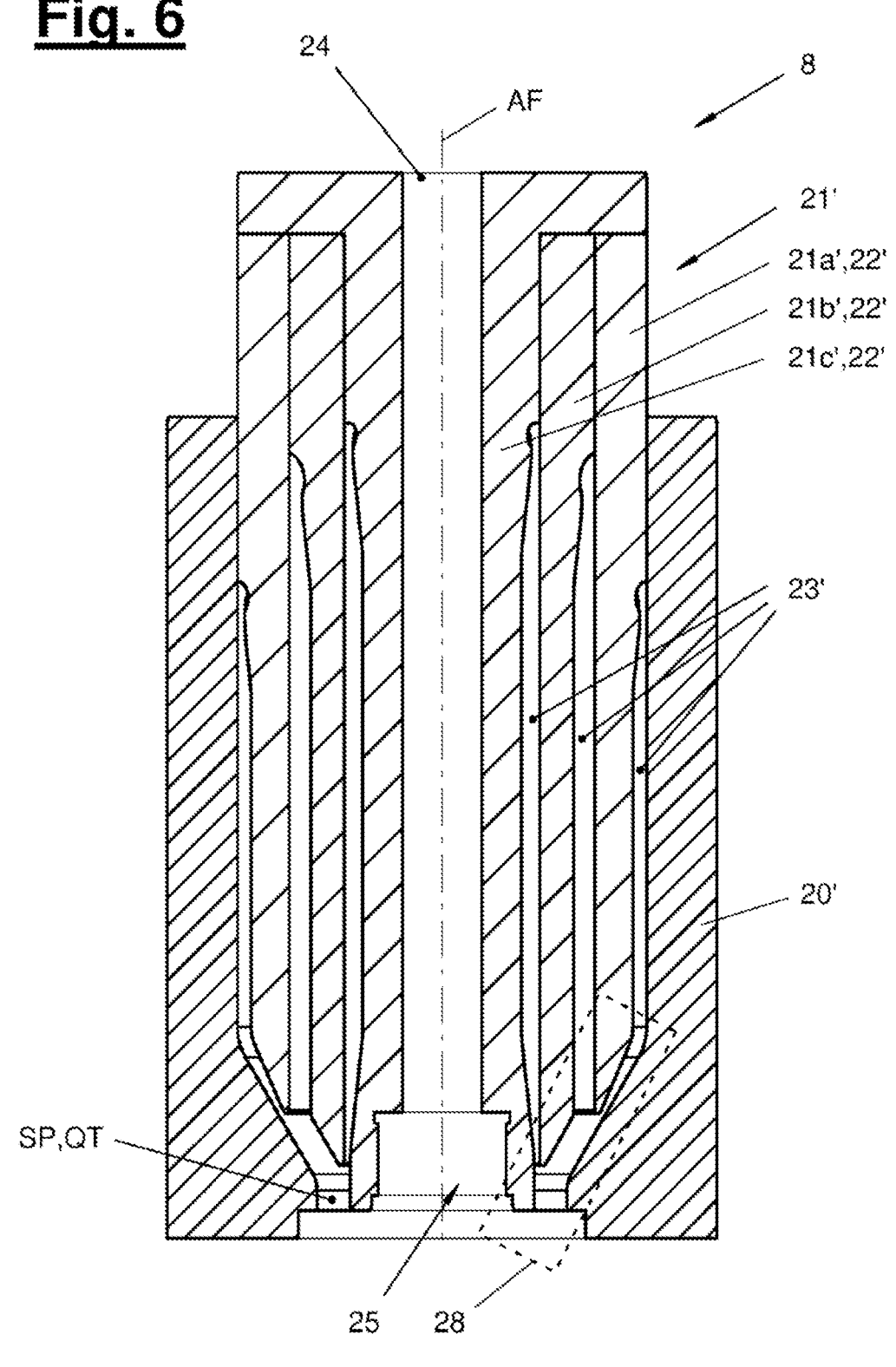

As results from the cross-sectional representation in FIG. 6, a first outer guiding passage (23') is formed between the inner contour of the housing (20) and an outer contour of an outer shaping sleeve (21*a'*). A second and in this case central guiding passage (23') is formed between the radially inward facing outer contour of the outer shaping sleeve (21*a'*) and the outer contour of an adjacent shaping sleeve, here the intermediate shaping sleeve (21*b'*). An additional, here inner, guiding passage (23') is formed between the radially inward facing outer contour of the intermediate shaping sleeve (21*b'*) and the outer contour of an additional adjacent shaping sleeve, here the inner shaping sleeve (21*c'*). In summary, each guiding passage (23') is thus delimited by the outer contours of two adjacent shaping sleeves (21*a'*, 21*b'*, 21*c'*) or by the housing (22').

At the outlet-side ends of the shaping sleeves (21'), a layer forming section (28) is arranged, in which the multiple guiding passages (23) lead into a collecting passage. In the collecting passage, the streams of polymer melt from the respective guiding passages (23') overlap to form a collective stream which can be dispensed through a melt passage (SP) with tubular cross section (QT) to a subsequent component.

Figure 7:
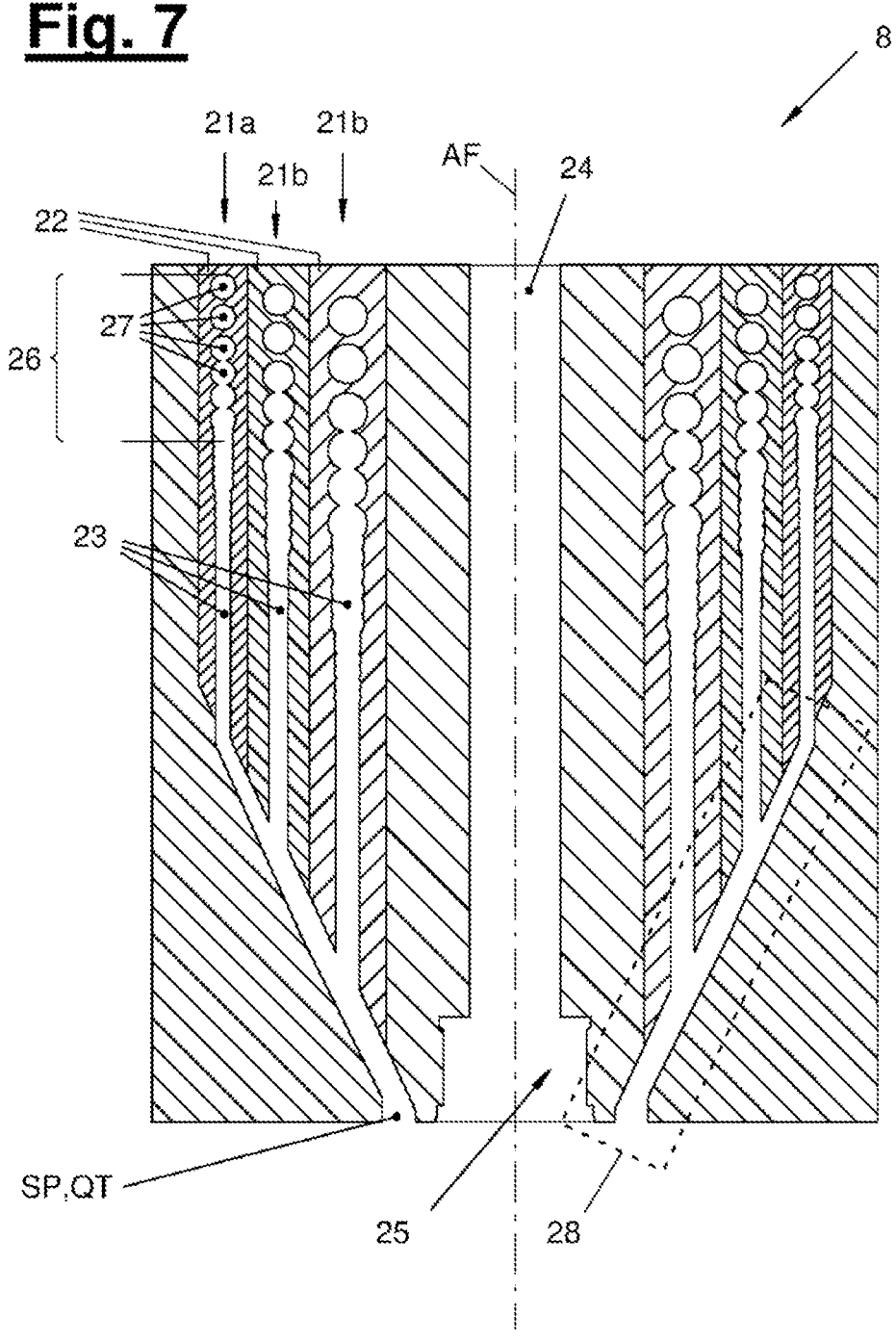
FIG. 7: a cross-sectional representation of an alternative example of a tube-forming device.

FIG. 7 shows an example variant of a tube-forming device (8) designed according to an aspect of the present disclosure. Here too, at least one and preferably multiple shaping sleeves (21*a*, 21*b*, 21*c*) are provided, which are designed to shape a supplied stream of polymer melt from a substantially strand-like cross section (QS) into a tubular cross section (QT). However, in this example, the shaping sleeves (21*a*, 21*b*, 21*c*) have a sleeve wall (22) in which a respective guiding passage (23) is embedded. The guiding passage is thus located within the sleeve wall (23) and not next to the sleeve wall as in FIG. 6. In contrast to the examples of FIGS. 5 and 6, in the example according to FIG. 8, a guiding passage (23) is thus formed not between the outer boundary contours of two adjacent shaping sleeves or of a shaping sleeve and an outer housing (20'), but rather in each case within the wall of one of the individual shaping sleeves (21*a*, 21*b*, 21*c*).

FIGS. 26 to 29 show an additional design of an individual shaping sleeve (21), in the wall (22) of which multiple separate guiding passages (23*a*, 23*b*, 23*c*) are similarly embedded. The embedding of at least one guiding passage (23, 23*a*, 23*b*, 23*c*) within the wall (22) of a shaping sleeve (21*a*, 21*b*, 21*c*) has various advantages.

On the one hand, a single component may be used to form a guiding passage (23) or even multiple guiding passages (23*a*, 23*b*, 23*c*). If different guiding passage design types are used or desired, the exchange of one respective component is thus be used for a switch. Moreover, the sealing of the guiding passages is clearly designed more simply. In particular, in an inlet-side section of a guiding passage (23), no grooves or contact sites oriented substantially along the flow direction, on which possible deposits or accumulations could form, are used.

Moreover, more complex shapes of the guiding passages (23) are possible, in which in particular an inner and an outer boundary contour of the guiding passage (23) relative to the axial direction (AF) of the guiding cylinder (21) have any shape desired.

According to an example, in particular in an inlet-side zone, the guiding passage (23) has a spiral section (26) comprising multiple helical paths (27). The helical paths (27) can initially lie next to one another along the axial direction (AF) from the inlet side to the outlet side, and then they can be increasingly closer together such that they transition into one another. In other words, the guiding passage (23) in the inlet-side region can form a spiral distribution.

Alternatively or additionally, one or more spiral sections (26) can be provided in a central region along the axial direction (AF) and, for example, be combined with a cardioid distribution in the inlet region.

The guiding passage (23) preferably has a spiral section (26) which comprises multiple helical paths, the cross-sectional contour of which (with respect to the axial direction (AF) of the shaping sleeve (21)) is delimited in radial direction on both sides, i.e., inward and outward, by a spherical contour, in particular a (partially) circular contour or an elliptic contour. It has been found that such a shaping of the guiding passage has a positive influence on the homogeneity of the conveyed polymer melt, in particular with respect to a shaping shown in FIGS. 5 and 6, in which a cross-sectional contour in radial direction is delimited at least on one side by a flat or linear contour.

A shaping sleeve (21) according to FIGS. 26 to 29, which, as a single-piece body, has a plurality of guiding passages (23*a*, 23*b*, 23*c*) and in particular the guiding passages (23*a*, 23*b*, 23*c*), wherein the guiding passages (23*a*, 23*b*, 23*c*) are passages embedded within the sleeve wall (22), has particular advantages. On the inlet side and/or on the outlet side, it can have a common sealing contour. Furthermore, it exhibits a substantially standardized shaping behavior (in particular due to thermal expansion/shrinkage). During the operation of the extrusion device (1), accordingly, fewer parasitic effects occur, such as, for example, an overrun of melt between the melt passages which are themselves separated due to thermal widening of sealing gaps), or a variation of the volume of the melt passages (due to greater expansion of an outer shaping sleeve with respect to an adjacent inner shaping sleeve), or an incorporation of material residues in sealing gaps, which lead to later contaminations.

Thus, the aforementioned design is also particularly advantageous for enabling a rapid material change, increasing the product quality and increasing the process quality.

Figure 12:
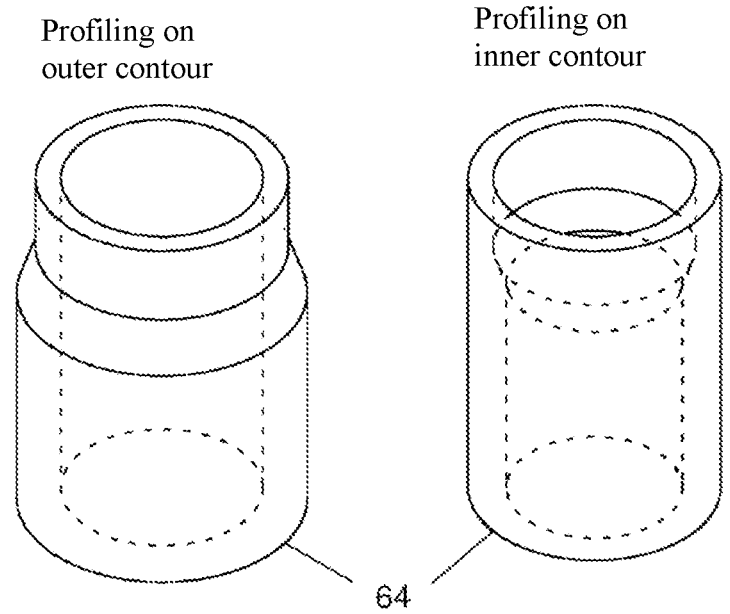
FIG. 12: diagrammatic comparative representations of preforms with a wall profiling.
Figure 13:
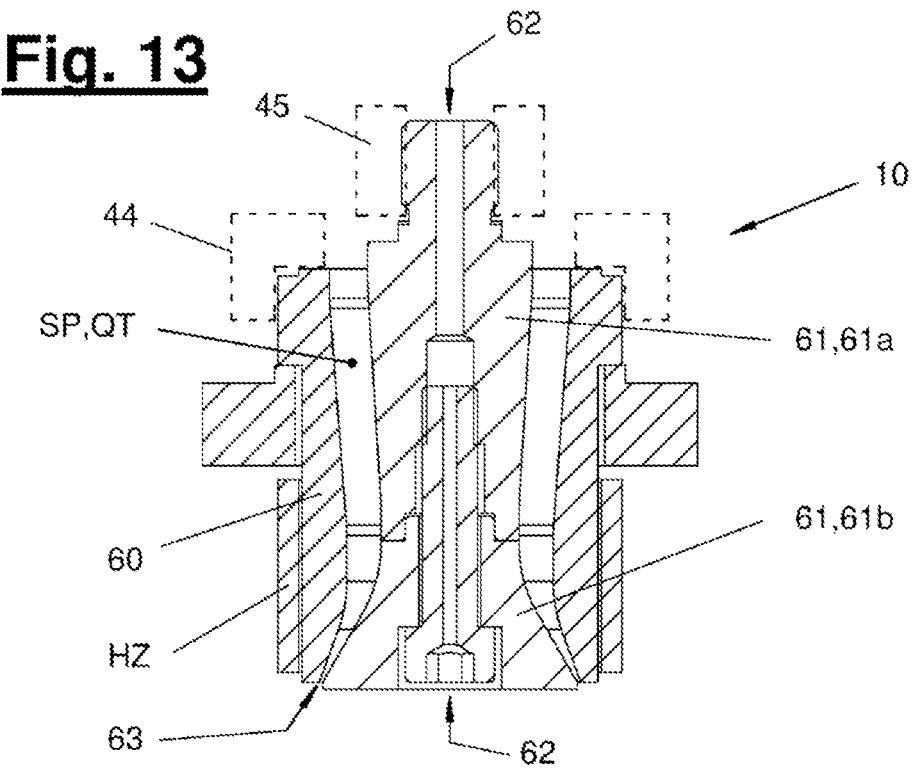
FIG. 13: an isolated cross-sectional representation of a dispensing tool.

FIGS. 8 to 11 and 22 to 25 show various views of a profiling device (9) which can be designed, on the one hand, for a nozzle body movement and, on the other hand, for a mandrel body movement. The profiling device (9) is provided and designed to be used in an extruder unit (4) according to the present disclosure, in particular in a section of the melt passage (SP) between a tube-forming device (8) and a dispensing tool (10). In FIG. 13, the dispensing tool (10) is shown separately in a cross-sectional representation. It comprises a hollow nozzle body (60) and a mandrel body (61) which can be arranged or is arranged in the nozzle body (60). Depending on the design type of the profiling device (9), the nozzle body (60) is (exclusively) movable, or the mandrel body (61) is (exclusively) movable, or both the nozzle body (60) and the mandrel body (61) are movable. The movement occurs preferably parallel to an axial direction of the dispensing tool (10). Between the inner contour of the nozzle body (60) and the outer contour of the mandrel body (61), a melt passage (SP) with a tubular cross section (QT) is formed. The melt passage (SP) leads outward to an annular gap (63). The width of the annular gap can be set by the relative movement between nozzle body (60) and mandrel body (61). If the nozzle body (60) is moved relative to the stationarily positioned mandrel body (61), the outer contour of the annular gap (63) changes and respectively a profiling on the outer contour is generated, which is represented as an example in FIG. 10. While the tube-like stream of polymer melt exits on the inner side substantially without change via the mandrel body (61), its outer support is influenced by an upward or downward movement of the nozzle body (61). Accordingly, the profiling illustrated in FIG. 12 is generated on the outer contour of a preform which is formed from a section of the exiting tube of polymer melt.

On the other hand, if the mandrel body (61) is moved relative to a stationarily positioned nozzle body (60), the inner contour of the annular gap (63) changes, and respectively a profiling of the inner contour occurs. In this case, the polymer melt on the outer contour flows out substantially unchanged, whereas, on the inner contour, due to the movement of the mandrel body (61), said polymer melt is influenced. Accordingly, a wall thickness change illustrated in FIG. 12 on the right side occurs more on the inner side of the preform (64).

In an alternative example variant (not represented), the principles of the nozzle body movement and of the mandrel body movement can be provided jointly. The features described hereafter with respect to the respective profiling devices for the nozzle body movement and the mandrel body movement can be used in any possible combination.

Figure 8:
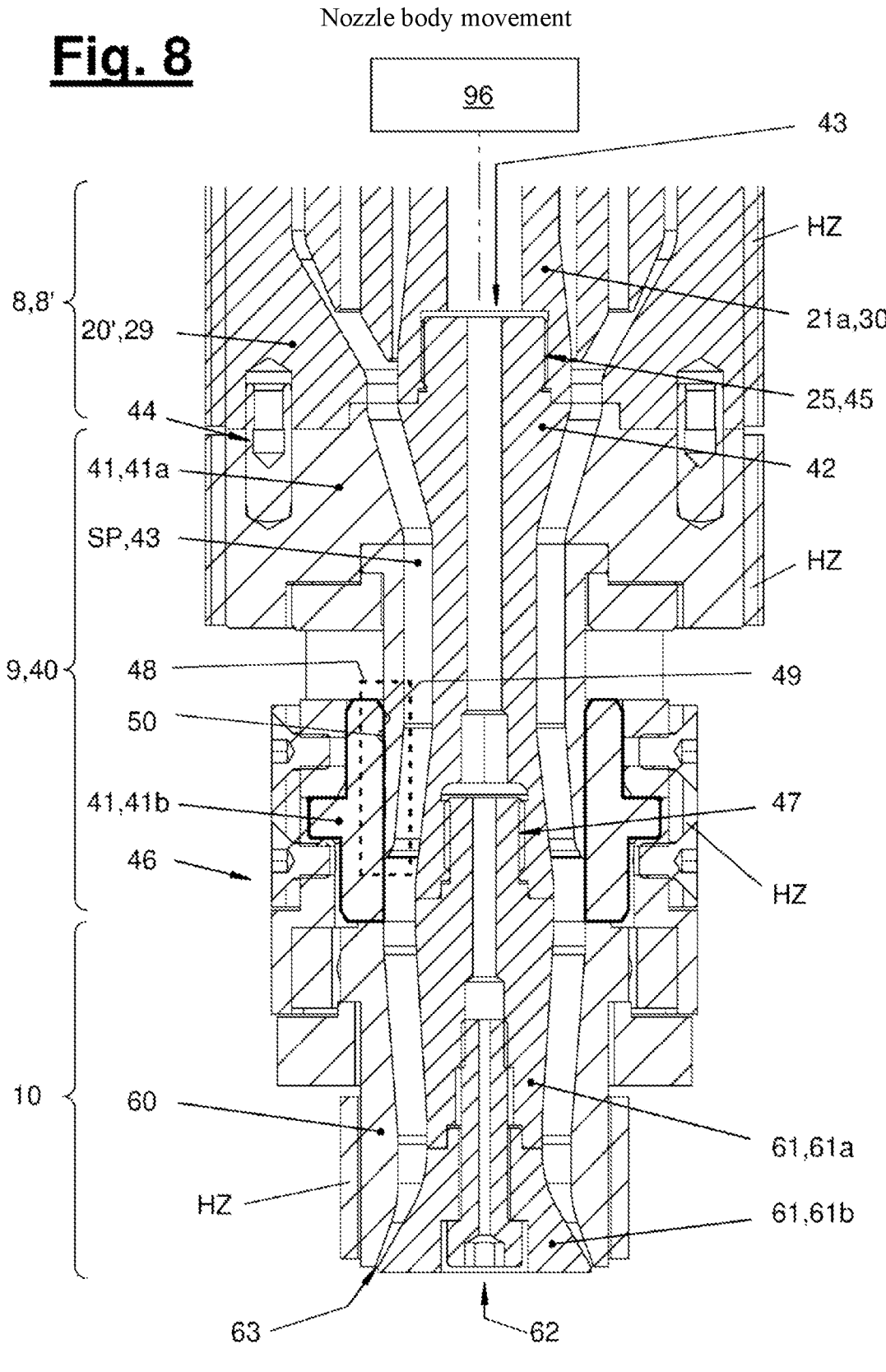
Figure 9:
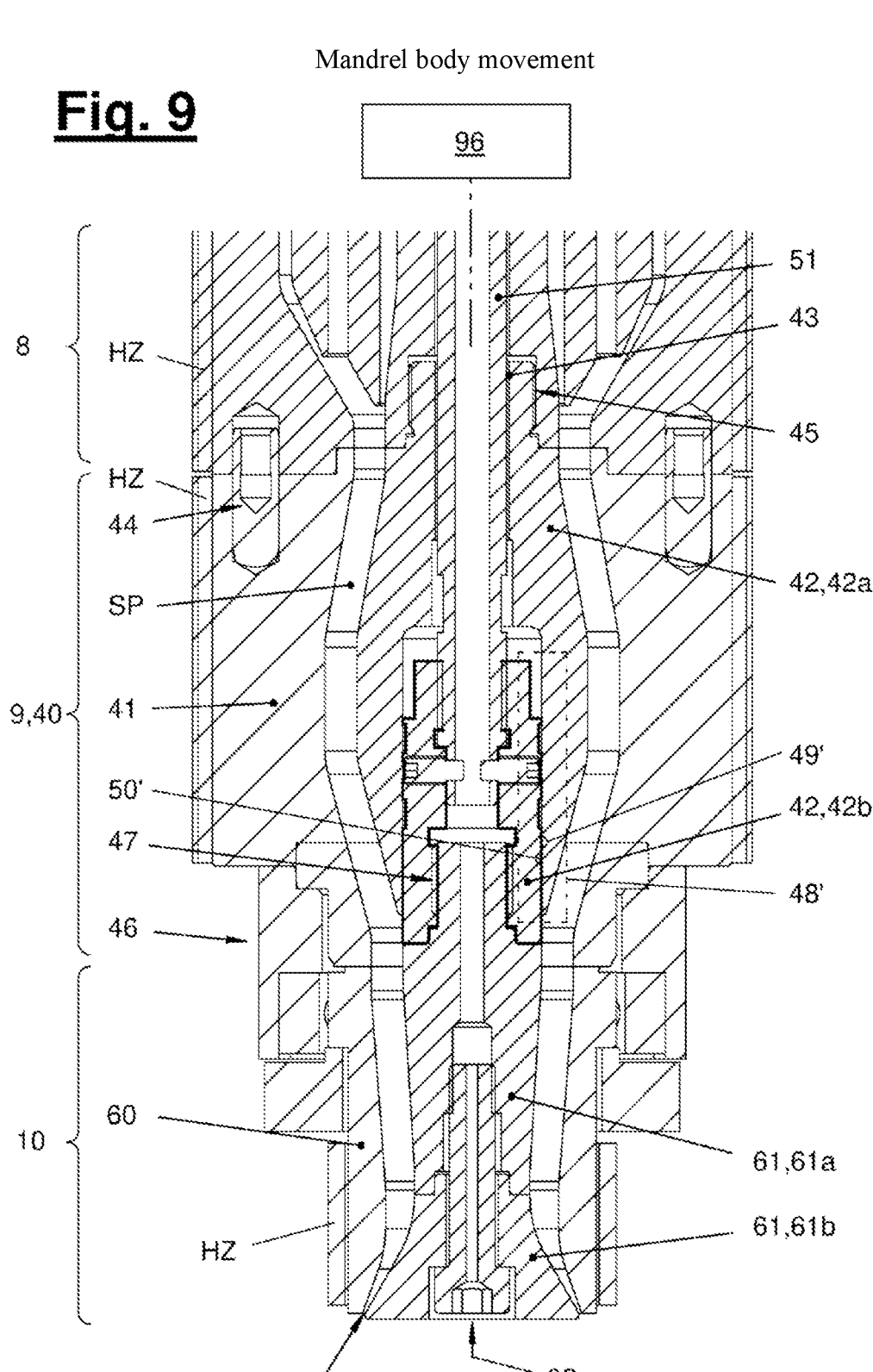

The profiling device according to the present disclosure is shown in FIGS. 8 and 9 in an enlarged cross-sectional view. It has a base body (40) with an outer portion (41) and an inner portion (42). The outer portion (41) (together with the nozzle body (60)) is shown with wide hatching in FIGS. 8 and 9, while the inner portion (42) (together with the mandrel body (61)) is shown with a narrow hatching.

Between the outer portion (41) and the inner portion (42), the melt passage (SP) with tubular cross section (QT) is formed, into which, on the inlet side, a stream of polymer melt, and in particular the collective stream which can be dispensed from the tube-forming device (8), can be introduced.

The outer portion (41) and the inner portion (42), on the inlet side, each have separate fastening structures (44, 45). An inlet-side fastening structure (44) on the outer portion is designed to connect the outer portion (41) to an outer section (29) of the tube-forming device (8). The inlet-side fastening structure (45) on the inner portion (42) is designed to connect the inner portion (42) to an inner section (30) of the tube-forming device (8). The inlet-side fastening structures (44, 45) are thus designed, on the one hand, to connect the outer portion (41) to the outer section (29) of the tube-forming device (8) and, on the other hand, to connect the inner portion (42) to the inner section (30) of the tube-forming device (8).

The outer portion (41) and the inner portion (42), on the outlet-side, have additional fastening structures (46, 47). The outlet-side fastening structure (46) of the outer portion is designed to connect the outer portion (41) to the nozzle body (60) of the dispensing tool (10). The outlet-side fastening structure on the inner portion (42) is designed to connect the inner portion (42) to the mandrel body (61) of the dispensing tool (10). In other words, the outlet-side fastening structures (46, 47) are designed, on the one hand, to connect the outer portion (41) to the nozzle body (60) of the dispensing tool (10) and, on the other hand, to connect the inner portion (42) to the mandrel body (61) of the dispensing tool (10).

The outer portion (41) and the inner portion (42) can each have a multi-part design and in particular they can each have an inlet-side body portion (41*a*, 42*a*) and an outlet-side body portion (41*b*, 42*b*).

The base body (40) of the profiling device (9) has a sliding section (48) designed to lengthen or shorten the outer portion (41), in particular due to a slidability between the inlet-side body portion of the outer portion (41*a*) and the outlet-side body portion of the outer portion (41*b*).

Alternatively or additionally, the base body (40) has a sliding section (48') designed to lengthen or shorten the inner portion (42), in particular due to a slidability between the inlet-side body portion or the inner portion (42*a*) and the outlet-side body portion of the inner portion (42*b*).

By lengthening or shortening the outer portion (41) or the inner portion (42) it can thus be achieved that the relative position of the outlet-side fastening structures (46, 47) can be or is set. By this change of the relative position of the fastening structures (46, 47), the connected nozzle body (60) and the connected mandrel body (61) can be moved relative to one another, such that the above-described profiling can be or is generated by a nozzle body movement or a mandrel body movement.

A sliding section (48, 48') can have any design desired.

A sliding section (48) which is arranged for profiling by a nozzle body movement on the outer portion (41) separates the outer portion (41) into the inlet-side body portion body (41*a*) and the outlet-side body portion (41*b*), which can be moved and in particular slid in axial direction with respect to one another. The inlet-side body portion (41*a*) and the outlet-side body portion (41*b*) together form an outer contour of the melt passage (SP) within the profiling device.

A sliding section (48') which is arranged for profiling by a mandrel body movement on the inner portion (42) separates the inner portion (42) into the inlet-side body portion (42*a*) and the outlet-side body portion (42*b*), which can be moved and in particular slid in axial direction with respect to one another. The inlet-side body portion (42*a*) and the outlet-side body portion (42*b*) together form an inner contour of the melt passage (SP) within the profiling device (9).

In FIGS. 8 to 11, in each case the outlet-side body portions (41*b*, 42*b*) of outer portion (41) or inner portion (42) are provided with a border line in bold. The respective sliding section (48, 48') is highlighted by a dashed-line box. The outlet-side body portion (41*b*, 42*b*) is in each case the movable section of the outer portion (41) or inner portion (42).

A movement of the outlet-side body portion (41*b*, 42*b*) can be brought about in any desired way, preferably by an external movement device (11) which is connected by at least one push rod (51, 95) to the respective body portion (41*b*, 42*b*).

For the movement of the outlet-side body portion (42*b*) of the inner portion (42), a central push rod (51) is preferably provided. In a design for the mandrel body movement or a combined profiling by means of nozzle body movement and mandrel body movement, the profiling device thus preferably comprises a push rod (51). The outlet-side body portion (52*b*) of the inner portion (42) is or can be connected to the push rod (51). The push rod (51) is preferably arranged or can be arranged in a passage opening (43) of the housing (40) of the profiling device (9) and in particular in a passage opening (43) of the inlet-side body portion (42*a*) of the inner portion (42).

The push rod (51) furthermore is preferably designed to be hollow, such that it can form a section of a fluid-conducting channel.

In the design types of the profiling device, the sliding section (48, 48') can have a cylindrical guiding contour (49) which is connected to the respective inlet-side body portion (41*a*, 42*a*) or integrated on the inlet-side body portion (41*a*, 42*a*). The cylindrical guiding contour (49) is marked in FIGS. 8, 9, 22 and 24.

The sliding section (48, 48') can furthermore preferably have a cylinder wall (50) mounted so that it can slide on the guiding contour (49) in axial direction. The cylinder wall (50) is connected to the respective outlet-side body portion (41*b*, 42*b*) or integrated thereon.

In other words, the sliding section (48, 48') comprises cylindrical slide bearing wall sections which correspond to one another. According to a variant, within a sliding section (48, 48'), at least one sealing means is provided.

Figure 16:
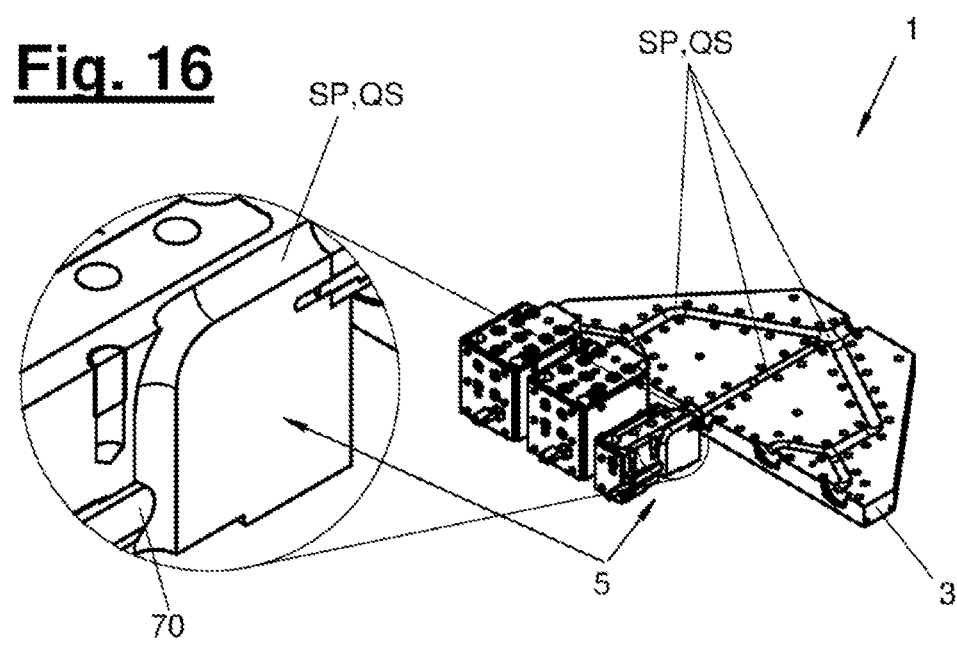
Figure 17:
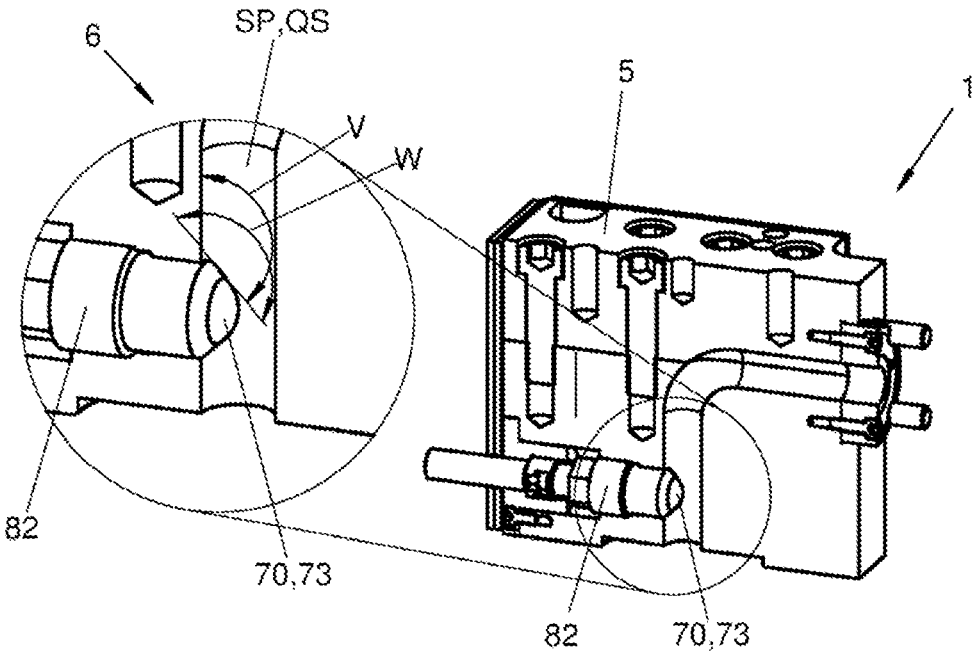

FIGS. 14 to 19 show different example types of a throttling device (6). In FIGS. 16 and 17, throttle pins (70) are shown, the dorsal end (73) of which can be introduced into a melt passage (SP) of the extrusion device (1), in particular in the region of a redirection (5). The throttle pins (70) shown here are connected on the end side to a setting means which is arranged coaxially with respect to the throttle pin (70). The distal end of the throttle pin (70), that is to say the outward facing end, is supported on the setting element. By a movement of the setting element, in particular by a screwing movement, in the axial direction, the penetration depth of the throttle pin (70) into the melt passage (SP) can be varied, in order to influence and in particular reduce the throughflow cross section of the melt passage (SP).

The throttling causes a change of volume flow of the polymer melt in the respective melt passage and thus a change of the tube length dispensed per unit of time from an extruder unit (4). During an operation of the extrusion device (1), the throttle pins (70) on multiple extruder units (4) can be set in such a manner that the tube lengths dispensed on the extruder units per unit of time are set with respect to one another and, for example, set to a standardized length per unit of time.

FIGS. 14, 15, 18 and 19 show a throttling device (6) which has multiple throttle pins (70, 71, 72), in order to simultaneously throttle multiple streams of polymer melt on an extruder unit (4), which flow in multiple separate melt passages (SP). In the example shown, three parallel or separate melt passages (SP) per extruder unit (4) are shown. Alternatively, one, two, four or another number of melt passages can be provided.

Even if the throttling device according to FIGS. 14, 15, 18 and 19 is designed and provided for the parallel throttling of multiple streams of polymer melt on each extruder unit (4), the throttling device can also advantageously be used on an extruder unit (4) with only one melt passage or stream of polymer melt. Here, the throttling device (6) also has one or more throttle pins (70, 71, 72), the respective dorsal end (73) of which can be introduced into a melt passage (SP) of the extrusion device (1) in order to reduce its throughflow cross section. The at least one throttle pin (70, 71, 72) on the distal end, i.e., on the outward facing end, in the axial direction of the throttle pin, is supported or fixed on a movable guiding element (75, 76, 77). Preferably, for each throttle pin (70, 71, 72), a separate guiding element (75, 76, 77) is provided. The guiding element (75, 76, 77) can have any design desired. It extends, at least in sections, in transverse direction with respect to the throttle pin (70, 71, 72). In a region of the guiding element (75, 76, 77) which is offset transversely with respect to the throttle pin, the guiding element (75, 76, 77) is supported on a movable setting means (79, 80, 81). The guiding element (75, 76, 77) acts as force or adjustment travel transmission means, so that a movement of the setting means (79, 80, 81) can be converted into an axial movement of the throttle pin (70, 71, 72) by the guiding element (75, 76, 77).

The multiple setting means (79, 80, 81) of a throttling device (6) can preferably be arranged directly adjacent to one another, in particular as a linear group and/or in particular in a central region between the throttle pins (70, 71, 72). The group-wise and in particular linear arrangement of the setting means (79, 80, 81) for the multiple throttle pins (70, 71, 72) has considerable advantages particularly in extrusion devices (1) with a plurality of extruder units (4) which in turn have a plurality of melt passages (SP). On the one hand, a central accessibility to the setting elements (79, 80, 81) on an extruder unit (4) can be created. On the other hand, the ordered placement of the setting elements leads to considerably increased clarity and simplified operation.

In the example variants of the throttling device (6), a throttle pin and in particular each throttle pin (70, 71, 72) can be received in a (respective) guiding sleeve (82). The guiding sleeve (82) preferably is or can be firmly connected to the extrusion device (1). The guiding sleeve can be arranged in such a manner that its dorsal end projects into the melt passage (SP). The dorsal end of the guiding sleeve (82) can preferably have a spherical contour and/or a bevel (see FIGS. 15 and 17). Preferably, the guiding sleeve (82) is designed and arranged in such a manner that only the subregion of the dorsal end which has a bevel or spherical contour projects into the melt passage (18). The spherical contour can be concave or convex. A contour transition between the dorsal end of the guiding sleeve (82), in particular the region with bevel or spherical contour, and the adjacent surface of the melt passage (SP) preferably has an obtuse transition angle (V) (see FIG. 17). The transition angle can preferably be in a range of 110 angular degrees to 160 angular degrees, in particular approximately 135 angular degrees.

A contour transition between the guiding sleeve (82) and the front surface of the throttle pin, in a passive position (in an operating position of the throttle pin maximally slid outward), preferably has a passive contact angle (W, see FIG. 17) which is approximately 180 angular degrees. In other words, the front contour of the throttle pin (70) and the front contour of the guiding sleeve are aligned in this position.

A contour transition between the guiding sleeve (82) and the lateral surface of the throttle pin (70), in an active position (in an inward slid operating position of the throttle pin), preferably has an active contact angle (W', see FIG. 15, enlarged section) which is an obtuse angle, in particular analogously to the above explanations for the transition angle V, with a value between 110 angular degrees and 160 angular degrees, moreover preferably a value of approximately 135 angular degrees.

It has been shown that, by the aforementioned angular relationships on the contour transition from passage surface to guiding sleeve front and on the contour transition from guiding sleeve front to throttle pin, dead zones can be reduced or avoided and respectively material deposits can be reduced, which favors the aforementioned advantages of increased material homogeneity as well as improved quality of the plastic articles produced and increased process quality.

The guiding elements (75, 76, 77) can be designed identically or differently. In particular, they can each be designed as sliding lever or as rotating lever.

The one or more setting means (79, 80, 81) can have any design desired. They can be manually and/or mechanically operable. In particular, they can each be designed as setting screw or as linear actuator.

Figure 14:
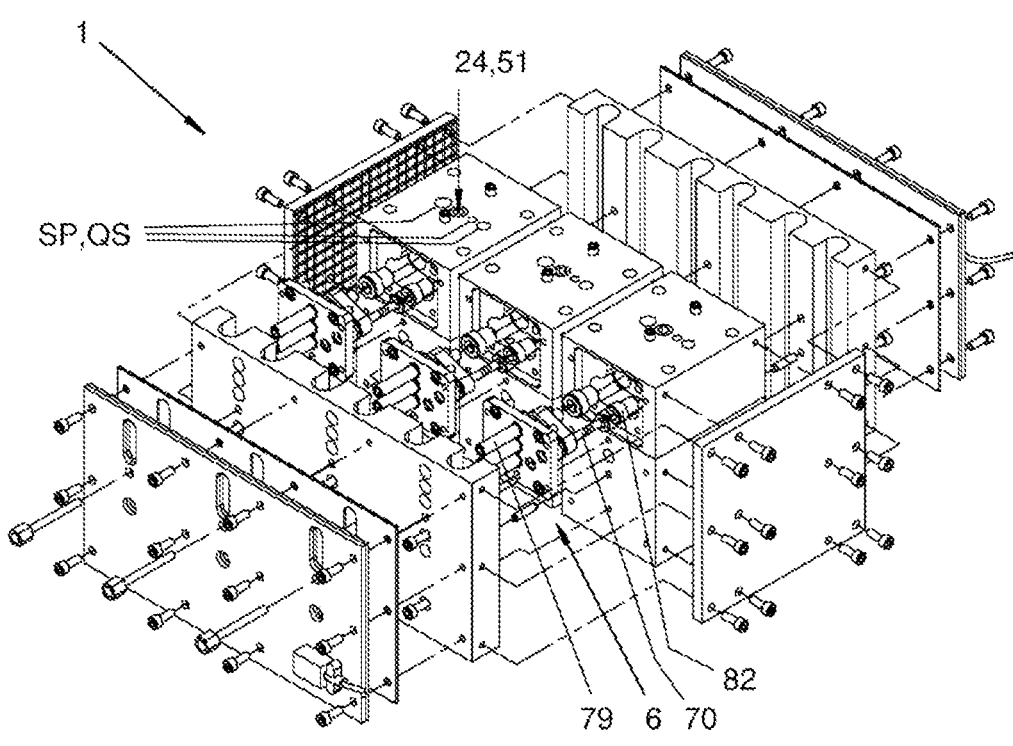
FIGS. 14-19: various representations for explaining a throttling device in different example variants.
Figure 15:
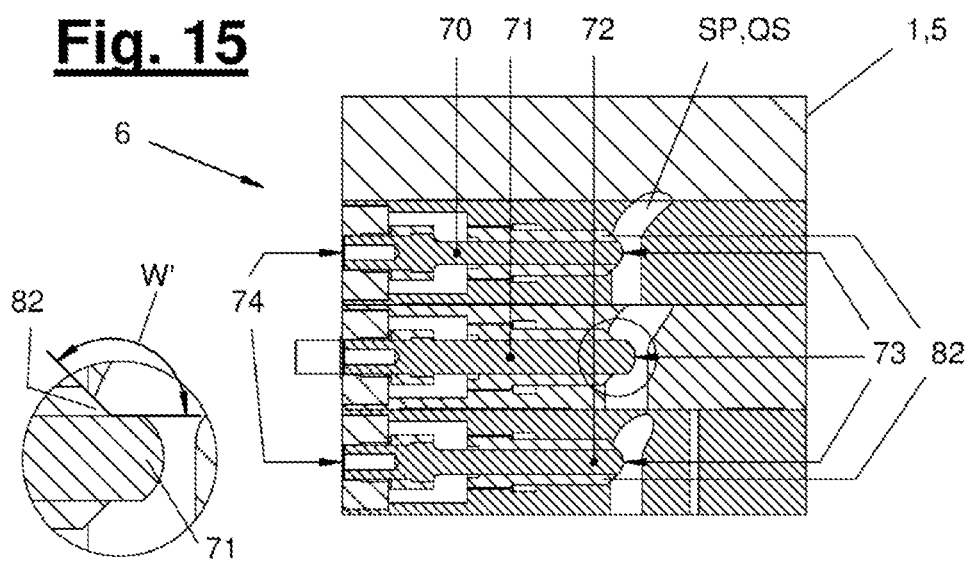
Figure 18:
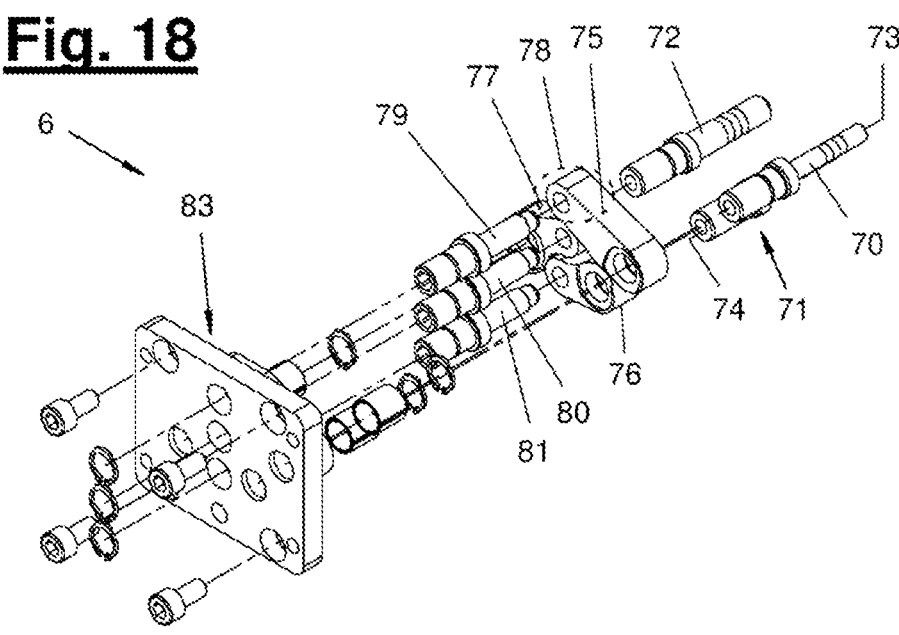
Figure 19:
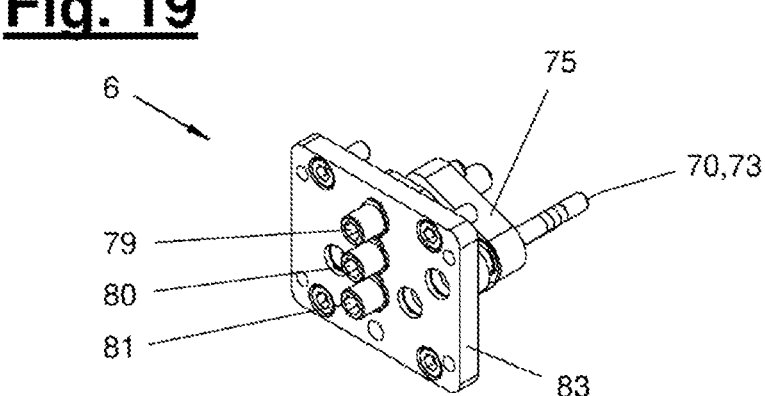

According to the representation in FIGS. 14, 18 and 19, the throttling device (6) preferably has a support body (83) on which the at least one guiding element and in particular the guiding elements (75, 76, 77) and the at least one setting means and in particular the setting means (79, 80, 81) for a respective extruder unit (4) are mounted. Thereby, a common and rapid positioning as well as a rapid exchange of the throttling device (6) is facilitated. The support body (83) can preferably have a fastening section for positioning and detachable fastening on a housing portion of the extrusion device (1), in particular on a redirection (5).

The dorsal end (73) of a throttle pin and in particular of the throttle pins (70, 71, 72) which can penetrate into a melt passage (SP) preferably has a spherical contour. Such a shaping, alone or in combination with a spherical or beveled contour of the guiding sleeve (82), can counteract the formation of deposits or material accumulations of the polymer melt, which entails the aforementioned advantages.

The extruder unit according to the present disclosure is provided and designed for producing preforms (64) with a tube-like wall made of a supplied polymer melt. The extruder unit (4) comprises at least one dispensing tool (10) according to the design explained above. It further comprises at least one profiling device (9) and/or tube forming device (8) and/or throttling device (6) according to the present disclosure.

Particularly preferably, the extruder unit (4) has a modular design and comprises at least two different profiling devices (9) and/or at least two different tube-forming devices (8)

and/or at least two different dispensing tools (10), which can be connected to one another by standardized fastening structures.

The two different profiling devices (9) can alternately be connectable to the same dispensing tool (10) and/or to the same tube-forming device (8). The at least two tube-forming devices (8) can each be alternately connectable to the same or to each of the profiling devices (9) and/or alternately to an upstream component of an extrusion device (1) in the flow direction of the polymer melt, in particular to a throttling device (6) and/or to a redirection (5). The at least two different dispensing tools (10) can alternately be connectable to the same profiling device (9) or to each of the profiling devices (9).

The fastening structures (44, 45, 46, 47) of the multiple profiling devices (9) and the corresponding structures on the tube-forming device (8) and/or on the dispensing tool (10) thus have a matching interface geometry.

The extruder unit (4) or the extrusion device (1) can comprise an overpressure fluid supply (96) which has a fluid-conducting connection through one or more aligned passage openings (43, 42) up to an outlet-side front wall of the mandrel body (61). The overpressure fluid supply (96) can be designed to fill or inflate with a fluid a melt tube exiting from a dispensing tool (10). The melt tube can be closed or become closed, for example, on the downstream end, such that, by the introduction of a fluid, a dynamic pressure can be generated within the tube interior.

The one or more passage openings (43, 62) are preferably arranged along the central axis of the one or more flow passages (SP) within the dispensing tool (10), the profiling device (9) and a tube-forming device (8). A cavity of a push rod (51) for the profiling by mandrel body movement can also be provided as passage opening for the fluid-conducting connection.

FIG. 2 shows an example variant of a movement device (11). The movement device (11) can have any design desired. It is preferably provided and designed for actuating a profiling device (9) and in particular multiple profiling devices (9) with different ones of the design types mentioned above for exclusive nozzle body movement and/or for exclusive mandrel body movement and/or combined nozzle body movement and mandrel body movement. In the example of FIG. 2, the movement device (11) has an actuator (90) which is designed, for example, as piston cylinder unit or other linear drive. The actuator (90) is preferably caused to move by a control (91) which can in particular be position-controlled or position-regulated or speed-controlled or speed-regulated. Alternatively or additionally, a force-controlled or force-regulated movement can be provided.

The movement device (11) has a movement transmission means and in particular a transmission (92) which connects the actuator (90) to at least one profiling device (9) of the at least one extruder unit (4). Preferably a rigid or force-conducting connection is provided between a drive means, in particular a piston rod (93) of the actuator (90), and an outlet-side body portion (41*b*, 42*b*) of one and in particular of each profiling device (9). For this purpose, the movement device (11) can have a force distributor (94) which transfers the movement of the drive means (93) in one or multiple steps to one or more push rods (51, 95).

The examples described herein can be modified in various ways. In particular, the features described, shown or claimed for the respective examples and aspects of the disclosure can be combined or replaced with one another in any desired way.

Each component of an extruder unit (4) can also be a component of an extrusion device (1) and vice versa. Sections of the melt passage (SP) can be shifted between adjacent components of an extruder unit (4) or of the extrusion device (1) with regard to their local association. Between the disclosed components of the extruder unit (4) and the extrusion device (1), additional line sections can be provided.

An extruder unit (4) can be designed with or without a profiling device (9) as well as with or without a tube-forming device (8). Tube formation can possibly occur within a dispensing tool (10).

The melt receiving device (2) with a stirring body (15) with eccentrically arranged tip can be provided singly or multiply for only one or for multiple melt passages (SP) which are provided for supplying separate streams of polymer melt.

A movement device (11) can provide two or more separate actuators in order to actuate respectively an individual profiling device (9) or a group of two, three or more profiling devices (9). Moreover, a movement device (11) can have multiple actuators (90) and movement transmission means (92) in order to alternately or simultaneously bring about or prescribe a movement or actuation of a profiling device (9) by nozzle body movement and mandrel body movement. The multiple actuators (90) can preferably be connected to a common control (91) or to separate controls.

The melt-carrying components of the extrusion device (1) and of the extruder unit (4), which carry melt can have one or more heating devices (HZ). A heating device (HZ) is designed in particular as a flat heating device which can be applied or arranged on the outside on the respective body forming the melt passage (SP). Preferably one and in particular each heating device (HZ) is designed so that it can be open-loop controlled.

The dispensing tool (10) can comprise a multipart nozzle body (60) and/or a multipart mandrel body (61). In the figures shown, the mandrel body, for example, has a holding section (61a) and an extruder tool section (61b), wherein the holding section (61a) can be arranged on the end-side fastening structure (47) of the inner portion of the profiling device (9) and has a fastening interface for the extruder tool section (61b). Analogously, the nozzle body (60) can have a holding section and an extruder tool section (not represented).

The profiling device (9) is preferably designed to vary a relative position of the outlet-side fastening structures (46, 47) of outer portion (41) and inner portion (41). This variation occurs preferably with a linear shifting movement of at least one of these fastening structures (46, 47) parallel to the axial direction of the melt passage (SP). This relative movement can be converted on a dispensing tool into a uniform relative movement of nozzle body (60) and mandrel body (61). Alternatively, an at least partial movement redirection on the dispensing tool can occur, which is caused, for example, by a transmission. Such a movement redirection can cause a nonlinear and/or nonparallel relative movement of nozzle tool (60) and mandrel tool (61) to result from the linear relative movement of the fastening structures (46, 47). For example, there can occur a widening or narrowing of the nozzle body (60) occurring at least partially in radial direction, particularly at the annular gap (63) and/or a narrowing or widening of the mandrel body (60) occurring at least partially in radial direction, particularly at the annular gap (63).

LIST OF REFERENCE NUMERALS

1 Extrusion device
2 Melt receiving device
3 Melt distributor
4 Extruder unit
5 Redirection
6 Throttling device/tube length setting
7 Branching
8 Tube-forming device
9 (Wall thickness) profiling device
10 Dispensing tool
11 Movement device
12 Extrusion head
13 Guide body
14 Cavity
15 Stirring body (conical basic form)
15' Stirring body (pyramidal basic form)
16 Rotation axis
17 Tip
18 Melt supplying device
18a Conveyor cylinder
19 Worm/Worm conveyor
20 Housing
20' Housing
21 Shaping sleeve/shaping sleeve group
21a Outer shaping sleeve
21b Intermediate shaping sleeve
21c Inner shaping sleeve
21' Shaping sleeve group
21a' Outer shaping sleeve
21b' Intermediate shaping sleeve
21c' Inner shaping sleeve
22 Sleeve wall
22' Sleeve wall
23 Guiding passage
23a Guiding passage
23b Guiding passage
23c Guiding passage
23' Guiding passage
24 Central passage opening
25 Flange recess for profiling device
26 Spiral section
27 Helical path
28 Layer forming section
29 Outer section
30 Inner section
40 Base body
41 Outer portion
41a Inlet-side body portion of the outer portion
41b Outlet-side body portion of the outer portion
42 Inner portion
42a Inlet-side body portion of the inner portion
42b Outlet-side body portion of the inner portion
43 Passage opening
44 Fastening structure, outer portion to outer section of tube-forming device
45 Fastening structure, inner portion to inner section of tube-forming device
46 Fastening structure, outer portion to nozzle body
47 Fastening structure, inner portion to mandrel body
48 Sliding section
48' Sliding section
49 Cylindrical guiding contour
49' Cylindrical guiding contour
50 Cylinder wall
50' Cylinder wall
51 Push rod (hollow)
60 Nozzle body
61 Mandrel body
61a Holding section 61b Extruder tool section
62 Passage opening
63 Annular gap (closed, width adjustable)
64 Preform/tube piece (cut to length)
70 Throttle pin
71 Throttle pin
72 Throttle pin
73 Dorsal end
74 Distal end
75 Guiding element
76 Guiding element
77 Guiding element
78 Offset region
79 Setting means
80 Setting means
81 Setting means
82 Guiding sleeve
83 Support body
90 Actuator/piston cylinder unit/linear drive
91 Control
92 Movement transmission means/transmission
93 Drive means/piston rod
94 Force distributor
95 Push rod
96 Overpressure fluid supply
97 Round or oval cross section
97' Cross section with at least six corners
98 First section, truncated cone
98' First section, truncated prism
99 Second section, eccentric cone
99' Second section, eccentric pyramid
100 Circumferential edge
100' Circumferential edge
101 Cylindrical section
102 Wide cylindrical section
103 Funnel section
104 Narrow cylindrical section
AF Axial direction guiding cylinder
DI Inner diameter annular gap
DR Radial spacing point to rotation axis
FR Flow direction
HA Homogenization section
HZ Heating device
OB Surface transition in circumferential direction (with obtuse angle)
PA Plasticizing section
SP Melt passage
Q1 Cross section inlet-side/annular gap
Q2 Cross section outlet-side/full-surface
QK Cross-sectional contour
QS Strand-like cross section
QT Tubular cross section
UR Circumferential direction
V Transition angle
W Passive contact angle
W' Active contact angle
WA Angle transition
WB Angle transition

The invention claimed is:

1. A tube-forming device for an extruder unit or an extrusion device, the tube-forming device having an inlet side on a first end face in an axial direction, where a stream of polymer melt is supplied, and an outlet side on an opposing end face in the axial direction, where the polymer melt is dispensed to a subsequent component integrated within the extruder unit or the extrusion device, the tube-forming device comprising:
a shaping sleeve which is designed to shape the supplied stream of polymer melt from a substantially strand-like cross section (QS) into a tubular cross section (QT), wherein the shaping sleeve has a plurality of separate guiding passages embedded in a sleeve wall, such that each of the plurality of separate guiding passages is a cavity which lies within the sleeve wall and, in a radial direction perpendicular to the axial direction of the shaping sleeve, is enclosed in a sealed manner with respect to outer surfaces along the axial direction; and
wherein each of the plurality of separate guiding passages delimits an outer contour of a melt passage (SP) extending through the tube-forming device and through which the supplied polymer melt is guided from the inlet side to the outlet side, wherein the polymer melt is dispensed to the subsequent component integrated within the extruder unit or the extrusion device.

2. The tube-forming device of claim 1, wherein each of the plurality of separate guiding passages has a spiral section which comprises multiple helical paths which, in axial direction of a guiding sleeve, lie next to one another or transition into one another or both.

3. The tube-forming device of claim 1, wherein each of the plurality of separate guiding passages has a spiral section which comprises multiple helical paths, a cross-sectional contour of which is delimited in the radial direction of a guiding sleeve on both sides by a spherical contour, in particular by a circular contour or an elliptical contour.

4. A tube-forming process for shaping a stream of polymer melt, comprising:
providing a tube-forming device with at least one shaping sleeve, the tube-forming device having an inlet side on a first end face in an axial direction, where the stream of polymer melt is supplied, and an outlet side on an opposing end face in the axial direction, where the polymer melt is dispensed to a subsequent component integrated within the extruder unit or the extrusion device, the tube-forming device;
supplying the stream of polymer melt with a substantially strand-like cross section (QS) to the inlet side of the at least one shaping sleeve, characterized by:
shaping the stream of polymer melt within the at least one shaping sleeve into a tubular cross section (QT), wherein the at least one shaping sleeve is designed to shape a supplied stream of polymer melt from a substantially strand-like cross section (QS) into the tubular cross section (QT), wherein the at least one shaping sleeve has a plurality of guiding passages embedded in a sleeve wall, such that each of the guiding passages is a cavity which lies within the sleeve wall and, in a radial direction perpendicular to the axial direction of the at least one shaping sleeve, is enclosed in a sealed manner with respect to outer surfaces along the axial direction; and
wherein each of the plurality of guiding passages delimits an outer contour of a melt passage (SP) extending through the tube-forming device and through which the polymer melt is guided from the inlet side to the outlet side, wherein the polymer melt is dispensed to the subsequent component integrated within the extruder unit or the extrusion device.

* * * * *